(12) United States Patent
Oh et al.

(10) Patent No.: US 10,136,082 B2
(45) Date of Patent: Nov. 20, 2018

(54) METHOD OF DRIVING AN IMAGE SENSOR, IMAGE SENSOR EMPLOYING THE SAME, AND PORTABLE ELECTRONIC DEVICE INCLUDING THE SAME

(71) Applicants: Min-Seok Oh, Osan-si (KR); Young-Chan Kim, Seongnam-si (KR); Eun-Sub Shim, Anyang-si (KR); Moo-Sup Lim, Yongin-si (KR)

(72) Inventors: Min-Seok Oh, Osan-si (KR); Young-Chan Kim, Seongnam-si (KR); Eun-Sub Shim, Anyang-si (KR); Moo-Sup Lim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 444 days.

(21) Appl. No.: 14/616,368

(22) Filed: Feb. 6, 2015

(65) Prior Publication Data

US 2015/0373291 A1    Dec. 24, 2015

(30) Foreign Application Priority Data

Jun. 20, 2014    (KR) .......................... 10-2014-0075558

(51) Int. Cl.
*H04N 5/225*    (2006.01)
*H04N 5/357*    (2011.01)
(Continued)

(52) U.S. Cl.
CPC .......... *H04N 5/3575* (2013.01); *H04N 5/361* (2013.01); *H04N 5/37452* (2013.01)

(58) Field of Classification Search
CPC .............................. H04N 5/3575; H04N 5/378
See application file for complete search history.

(56) References Cited

U.S. PATENT DOCUMENTS

| 6,522,357 B2 | 2/2003 | Beiley et al. |
| 7,361,877 B2 | 4/2008 | McGrath et al. |

(Continued)

FOREIGN PATENT DOCUMENTS

| JP | 4965511 B2 | 7/2012 |
| JP | 2013135384 A | 7/2013 |

(Continued)

*Primary Examiner* — Twyler L Haskins
*Assistant Examiner* — Dwight Alex C Tejano
(74) *Attorney, Agent, or Firm* — Harness, Dickey, & Pierce, P.L.C.

(57) ABSTRACT

An image sensor includes a pixel array including at least one unit pixel configured to generate accumulated charges, a correlated double sampler configured to perform a correlated double sampling operation to extract an effective signal component based on a signal component and a reset component from the unit pixel for at least first and second read-out periods, the correlated double sampler configured to read out an image signal during the first read-out period and to read out a light noise signal during the second read-out period, an analog-digital converter configured to convert the image signal into a first digital signal and to convert the light noise signal into a second digital signal and an image compensator configured to generate a compensated image signal based on the second digital signal and the first digital signal.

19 Claims, 14 Drawing Sheets

(51) Int. Cl.
*H04N 5/361* (2011.01)
*H04N 5/3745* (2011.01)

(56) References Cited

U.S. PATENT DOCUMENTS

| | | | |
|---|---|---|---|
| 7,414,233 B2 | 8/2008 | Asaba | |
| 8,456,559 B2 | 6/2013 | Yamashita et al. | |
| 8,570,410 B2 | 10/2013 | Oike | |
| 8,654,231 B2 | 2/2014 | Kurokawa et al. | |
| 2006/0262205 A1* | 11/2006 | Lim | H04N 5/3456 348/241 |
| 2006/0274176 A1* | 12/2006 | Guidash | H01L 27/14643 348/300 |
| 2008/0018763 A1* | 1/2008 | Sato | H04N 5/335 348/308 |
| 2008/0224186 A1* | 9/2008 | Ellis-Monaghan | H01L 27/14609 257/292 |
| 2009/0256060 A1* | 10/2009 | Meynants | H04N 5/353 250/208.1 |
| 2010/0238332 A1* | 9/2010 | Watanabe | H04N 5/353 348/300 |
| 2011/0001859 A1* | 1/2011 | Matsuura | H04N 5/2354 348/296 |
| 2011/0260059 A1* | 10/2011 | Jiang | H01L 27/1461 250/330 |
| 2011/0298949 A1 | 12/2011 | Lee et al. | |
| 2012/0050557 A1* | 3/2012 | Atanassov | H04N 5/35581 348/222.1 |
| 2013/0188085 A1 | 7/2013 | Shim et al. | |
| 2013/0194472 A1* | 8/2013 | Takeda | H04N 5/374 348/308 |
| 2016/0134824 A1* | 5/2016 | Gomi | H01L 27/14618 348/76 |

FOREIGN PATENT DOCUMENTS

| | | |
|---|---|---|
| JP | 2013175951 A | 9/2013 |
| KR | 100660866 B1 | 12/2006 |
| KR | 101344539 B1 | 2/2008 |
| KR | 20100004800 A | 1/2010 |

* cited by examiner

METHOD OF DRIVING AN IMAGE SENSOR, IMAGE SENSOR EMPLOYING THE SAME, AND PORTABLE ELECTRONIC DEVICE INCLUDING THE SAME

CROSS-REFERENCE TO RELATED APPLICATION(S)

This application claims priority under 35 U.S.C. § 119 to Korean Patent Application No. 10-2014-0075558, filed on Jun. 20, 2014 in the Korean Intellectual Property Office (KIPO), the contents of which are incorporated herein in its entirety by reference.

BACKGROUND

1. Technical Field

Example embodiments generally relate to a global shutter image sensor. More particularly, example embodiments of inventive concepts relate to methods of driving an image sensor, image sensors employing the methods of driving the image sensor, and portable electronic devices including the image sensor.

2. Description of the Related Art

An image sensor is a semiconductor device that converts a photo image (e.g., light reflected by the subject) into an electric signal and thus is widely used in a portable electronic device such as a digital camera, a cellular phone, etc. Generally, the image sensor may be classified into a charged coupled device (CCD) image sensor and a complementary metal oxide semiconductor (CMOS) image sensor. Recently, the CMOS image sensor receives more attention compared to the CCD image sensor because the CMOS image sensor has many advantages such as low manufacturing costs, low power consumption, ease of integration with peripheral circuits, etc. In addition, the CMOS image sensor may be classified into a rolling shutter CMOS image sensor and a global shutter CMOS image sensor. Recently, many studies on the global shutter CMOS image sensor have been carried out because an image distortion (e.g., motion blur, jello effect, etc.) of the global shutter CMOS image sensor is less than that of the rolling shutter CMOS image sensor.

SUMMARY

In the global shutter CMOS image sensor, light noise (e.g., a leakage current, a dark current, etc.) may be caused while accumulated charges generated by a photoelectric conversion device are stored in a charge storage device. As a result, image quality degradation due to the light noise may occur in the global shutter CMOS image sensor.

At least some example embodiments provide a method of driving an image sensor (e.g., a global shutter image sensor) capable of preventing image quality degradation due to light noise caused while accumulated charges generated by a photoelectric conversion device are stored in a charge storage device.

At least some example embodiments provide an image sensor employing the method of driving the image sensor.

At least some example embodiments provide a portable electronic device including the image sensor.

According to an example embodiment, a method of driving an image sensor may drive a global shutter image sensor in which each unit pixel transfers accumulated charges generated by a photoelectric conversion device to a floating diffusion node via a charge storage device. Specifically, the method may include an operation of controlling the accumulated charges to be concurrently transferred from the photoelectric conversion device to the charge storage device in all unit pixels during a photoelectric conversion period, an operation of reading out each image signal by sequentially performing a first correlated double sampling operation on the unit pixels according to scan sequences (or, scan positions) of the unit pixels during a first read-out period, an operation of reading out each light noise signal by sequentially performing a second correlated double sampling operation on the unit pixels according to scan sequences of the unit pixels during a second read-out period following the first read-out period, and an operation of generating a compensated image signal by subtracting the light noise signal from the image signal.

In an example embodiment, the compensated image signal may be generated by subtracting a multiplied value from the image signal, the multiplied value being generated by multiplying the light noise signal by a compensation ratio that is determined according to a scan sequence of the unit pixel.

In an example embodiment, the compensation ratio may increase as the unit pixel has a later scan sequence in one frame.

In an example embodiment, the compensation ratio may correspond to a value that is generated by dividing a first time by a second time. Here, the first time may correspond to a time before the first correlated double sampling operation is performed on a scan-line in the first read-out period. In addition, the second time may correspond to a time between an end point of the first correlated double sampling operation on the scan-line in the first read-out period and a start point of the second correlated double sampling operation on the scan-line in the second read-out period.

In an example embodiment, the second read-out period may be set to be shorter than the first read-out period.

In an example embodiment, the first correlated double sampling operation may include a first reset component output operation and a first signal component output operation to read out the image signal, and the second correlated double sampling operation may include a second reset component output operation and a second signal component output operation to read out the light noise signal.

In an example embodiment, a second correlated double sampling period in which the second correlated double sampling operation is performed may be set to be shorter than a first correlated double sampling period in which the first correlated double sampling operation is performed.

In an example embodiment, a second signal component output period in which the second signal component output operation is performed may be set to be shorter than a first signal component output period in which the first signal component output operation is performed.

In an example embodiment, the second signal component output period may be set to be shorter as frames-per-second (FPS) of the image sensor increases, and may be set to be longer as the FPS of the image sensor decreases.

According to an example embodiment, an image sensor may include a pixel array including at least one unit pixel that generates accumulated charges corresponding to incident light during a photoelectric conversion period, a correlated double sampling unit configured to perform a correlated double sampling operation for extracting an effective signal component based on a signal component and a reset component that are output from the unit pixel, and configured to read out an image signal during a first read-out period and to read out a light noise signal during a second read-out period following the first read-out period, an analog-digital converting unit configured to convert the image signal into a first digital signal and to convert the light noise signal into a second digital signal, and an image compensating unit configured to generate a compensated image signal by subtracting the second digital signal from the first digital signal.

In an example embodiment, the image sensor may further include a control unit configured to control the pixel array, the correlated double sampling unit, the analog-digital converting unit, and the image compensating unit.

In an example embodiment, the image sensor may further include a digital signal processing unit configured to output a final image signal by performing a digital signal processing on the compensated image signal.

In an example embodiment, the correlated double sampling unit may be located inside the analog-digital converting unit, and the image compensating unit may be located inside the digital signal processing unit.

In an example embodiment, the unit pixel may include a photoelectric conversion device configured to convert the incident light into charges and to generate the accumulated charges by accumulating the charges, a charge storage device configured to store the accumulated charges, a first transfer transistor configured to operate based on a first transfer signal, the first transfer transistor being connected between the photoelectric conversion device and the charge storage device, a second transfer transistor configured to operate based on a second transfer signal, the second transfer transistor being connected between the charge storage device and a floating diffusion node, a reset transistor configured to operate based on a reset signal, the reset transistor being connected between the floating diffusion node and a high power voltage, a sensing transistor configured to operate based on the accumulated charges, the sensing transistor being connected to the high power voltage, and a select transistor configured to operate based on a row select signal, the select transistor being connected between the sensing transistor and an output terminal.

In an example embodiment, the unit pixel may further include an overflow transistor configured to operate based on an overflow signal, the overflow transistor being connected between the high power voltage and the photoelectric conversion device.

In an example embodiment, the photoelectric conversion device may be a photodiode, a phototransistor, or a pinned photodiode, and the charge storage device may be a storage diode.

In an example embodiment, the image compensating unit may generate the compensated image signal by subtracting a multiplied value from the first digital signal, the multiplied value being generated by multiplying the second digital signal by a compensation ratio that is determined according to a scan sequence of the unit pixel.

In an example embodiment, the compensation ratio may increase as the unit pixel has a later scan sequence in one frame.

In an example embodiment, the compensation ratio may correspond to a value that is generated by dividing a first time by a second time. Here, the first time may correspond to a time before the correlated double sampling operation is performed on a scan-line in the first read-out period. In addition, the second time may correspond to a time between an end point of the correlated double sampling operation on the scan-line in the first read-out period and a start point of the correlated double sampling operation on the scan-line in the second read-out period.

In an example embodiment, the second read-out period may be set to be shorter than the first read-out period. In addition, a second correlated double sampling period of the second read-out period in which the correlated double sampling operation is performed may be set to be shorter than a first correlated double sampling period of the first read-out period in which the correlated double sampling operation is performed.

In an example embodiment, a second signal component output period of the second read-out period in which the signal component is output may be set to be shorter than a first signal component output period of the first read-out period in which the signal component is output.

In an example embodiment, the second signal component output period may be set to be shorter as frames-per-second (FPS) of the image sensor increases, and may be set to be longer as the FPS of the image sensor decreases.

According to another example embodiment, an image sensor may include a pixel array including at least one unit pixel configured to generate accumulated charges corresponding to incident light during a photoelectric conversion period, a correlated double sampler configured to perform a correlated double sampling operation to extract an effective signal component based on a signal component and a reset component from the unit pixel for at least first and second read-out periods, the correlated double sampler configured to read out an image signal during the first read-out period based on the effective signal component for the second read-out period and to read out a light noise signal during the second read-out period following the first read-out period based on the effective signal component for the second read-out period, an image compensating unit configured to generate a compensated image signal by subtracting a multiplied value from the image signal, the multiplied value being generated by multiplying the light noise signal by a compensation ratio that is determined according to a scan sequence of the unit pixel, and an analog-digital converter configured to convert the compensated image signal into a digital signal.

In an example embodiment, the image sensor may further include a controller configured to control the pixel array, the correlated double sampler, the image compensator, and the analog-digital converter.

In an example embodiment, the image sensor may further include a digital signal processor configured to output a final image signal by performing a digital signal processing on the digital signal.

In an example embodiment, at least one selected among the correlated double sampler and the image compensator is in the analog-digital converter.

In an example embodiment, the image compensating unit may generate the compensated image signal by subtracting the multiplied value from the image signal.

In an example embodiment, the compensation ratio may increase as the unit pixel has a later scan sequence in one frame.

In an example embodiment, the compensation ratio may correspond to a first time divided by a second time. The first time may correspond to a time before the correlated double sampler performs the correlated double sampling operation on a scan-line in the first read-out period. The second time may correspond to a time between an end point of the correlated double sampling operation on the scan-line in the first read-out period and a start point of the correlated double sampling operation on the scan-line in the second read-out period.

In an example embodiment, the second read-out period may be shorter than the first read-out period. A second correlated double sampling period of the second read-out period in which the correlated double sampling operation is performed by the correlated double sampler may be shorter than a first correlated double sampling period of the first read-out period in which the correlated double sampling operation is performed by the correlated double sampler.

According to an example embodiment, a portable electronic device may include a global shutter image sensor, a display device configured to display an image based on a final image signal input from the global shutter image sensor, and a processor configured to control the global shutter image sensor and the display device. Here, the global shutter image sensor may include a pixel array including at least one unit pixel configured to generate accumulated charges corresponding to incident light during a photoelectric conversion period, a correlated double sampler configured to perform a correlated double sampling operation to extract an effective signal component based on a signal component and a reset component from the unit pixel for at least first and second read-out periods, the correlated double sampler configured to read out an image signal during the first read-out period based on the effective signal components for the first read-out period and to read out a light noise signal during the second read-out period following the first read-out period based on the effective signal component for the second read-out period, an analog-digital converter configured to convert the image signal into a first digital signal and to convert the light noise signal into a second digital signal, an image compensator configured to generate a compensated image signal based on the second digital signal and the first digital signal, and a digital signal processor configured to output the final image signal by performing a digital signal processing on the compensated image signal.

In an example embodiment, the image compensator is configured to generate the compensated image signal by subtracting a multiplied value from the first digital signal, the multiplied value being based on a product of the second digital signal and a compensation ratio, and the compensation ratio is based on a scan sequence of the unit pixel.

In an example embodiment, the compensation ratio may increase as the unit pixel has a later scan sequence in one frame.

In an example embodiment, the compensation ratio may correspond to a first time divided by a second time. The first time may correspond to a time before the correlated double sampler performs correlated double sampling operation on a scan-line in the first read-out period. The second time may correspond to a time between an end point of the correlated double sampling operation on the scan-line in the first read-out period and a start point of the correlated double sampling operation on the scan-line in the second read-out period.

In an example embodiment, the second read-out period may be shorter than the first read-out period. A second correlated double sampling period of the second read-out period in which the correlated double sampling operation is performed by the correlated double sampler may be shorter than a first correlated double sampling period of the first read-out period in which the correlated double sampling operation is performed by the correlated double sampler.

According to another example embodiment, a portable electronic device may include a global shutter image sensor, a display device configured to display an image based on a final image signal input from the global shutter image sensor, and a processor configured to control the global shutter image sensor and the display device. Here, the global shutter image sensor may include a pixel array including at least one unit pixel that generates accumulated charges corresponding to incident light during a photoelectric conversion period, a correlated double sampling unit configured to perform a correlated double sampling operation for extracting an effective signal component based on a signal component and a reset component that are output from the unit pixel, and configured to read out an image signal during a first read-out period and to read out a light noise signal during a second read-out period following the first read-out period, an image compensating unit configured to generate a compensated image signal by subtracting a multiplied value from the image signal, the multiplied value being generated by multiplying the light noise signal by a compensation ratio that is determined according to a scan sequence of the unit pixel, an analog-digital converting unit configured to convert the compensated image signal into a digital signal, and a digital signal processing unit configured to output a final image signal by performing a digital signal processing on the digital signal.

In an example embodiment, the image compensating unit may generate the compensated image signal by subtracting a multiplied value from the image signal, the multiplied value being generated by multiplying the light noise signal by a compensation ratio that is determined according to a scan sequence of the unit pixel.

In an example embodiment, the compensation ratio may increase as the unit pixel has a later scan sequence in one frame.

In an example embodiment, the compensation ratio may correspond to a value that is generated by dividing a first time by a second time. Here, the first time may correspond to a time before the correlated double sampling operation is performed on a scan-line in the first read-out period. In addition, the second time may correspond to a time between an end point of the correlated double sampling operation on the scan-line in the first read-out period and a start point of the correlated double sampling operation on the scan-line in the second read-out period.

In an example embodiment, the second read-out period may be set to be shorter than the first read-out period. In addition, a second correlated double sampling period of the second read-out period in which the correlated double sampling operation is performed may be set to be shorter than a first correlated double sampling period of the first read-out period in which the correlated double sampling operation is performed.

According to an example embodiment, a portable electronic device may include a global shutter image sensor configured to selectively operate in one of a single correlated double sampling mode in which a first correlated double sampling operation for reading out an image signal is only performed by the global shutter image sensor and a multiple correlated double sampling mode in which the first correlated double sampling operation and a second correlated double sampling operation for reading out a light noise signal are performed global shutter image sensor, the global shutter image configured to generate a final image signal based on the selected operation, a display device configured to display an image based on a final image signal input from the global shutter image sensor, and a processor configured to control the global shutter image sensor and the display device.

In an example embodiment, the global shutter image sensor may selectively operate in the one of the single correlated double sampling mode and the multiple correlated double sampling mode based on a user command or an algorithm.

In an example embodiment, the global shutter image sensor is configured to operate in the multiple correlated double sampling mode when a light noise elimination mode is selected as an image capturing mode of the portable electronic device by the user command or when light noise occurrence is determined to be larger than a reference value by the algorithm.

Therefore, a method of driving an image sensor according to example embodiments may drive a global shutter image sensor in which each unit pixel transfers accumulated charges generated by a photoelectric conversion device (e.g., a photodiode, a phototransistor, a pinned photodiode, etc.) into a floating diffusion node via a charge storage device (e.g., a storage diode, etc.). Here, the method may perform an additional correlated double sampling operation for reading out a light noise signal as well as a correlated double sampling operation for reading out an image signal, may generate a multiplied value by multiplying the light noise signal by a compensation ratio that is determined according to a scan sequence (i.e., a scan position) of the unit pixel, and may generate a compensated image signal by subtracting the multiplied value from the image signal. Thus, the method may prevent image quality degradation due to light noise (e.g., a leakage current, a dark current, etc.) that are caused while the accumulated charges generated by the photoelectric conversion device are stored in the charge storage device.

At least one example embodiment discloses an electronic device including a global shutter image sensor including a pixel array having at least one unit pixel configured to generate accumulated charges corresponding to incident light during a photoelectric conversion period, the global shutter image sensor further configured to extract a first effective signal component associated with a first read-out period and a second effective signal component associated with a second read-out period, the first read-out period and the second read-out period being after the photoelectric conversion period and before a next photoelectric conversion period, the global shutter image sensor configured to generate a an output image signal based on the first effective signal component and the second effective signal component and a display device configured to display an image based on the output image signal.

In an example embodiment, the global shutter image sensor is configured to extract the first effective signal component by correlated double sampling during the first read-out period and is configured to extract the second effective signal component by correlated double sampling during the second read-out period.

In an example embodiment, the first effective signal component is associated with an initial image signal and the second effective signal component is associated with a light noise signal.

In an example embodiment, the global shutter image sensor is configured to convert the initial image signal into a first digital signal and to convert the light noise signal into a second digital signal and the global shutter image sensor is configured to generate a compensated image signal based on the second digital signal and the first digital signal.

In an example embodiment, the first read-out period and the second read-out period are consecutive read-out periods.

In addition, an image sensor according to example embodiments may perform an additional correlated double sampling operation for reading out a light noise signal as well as a correlated double sampling operation for reading out an image signal, may generate a multiplied value by multiplying the light noise signal by a compensation ratio that is determined according to a scan sequence of the unit pixel, and may generate a compensated image signal by subtracting the multiplied value from the image signal. Thus, the image sensor may prevent image quality degradation due to light noise (e.g., a leakage current, a dark current, etc.) that are caused while accumulated charges generated by a photoelectric conversion device are stored in a charge storage device.

Further, a portable electronic device according to example embodiments may provide a high-quality image to users by including the image sensor.

BRIEF DESCRIPTION OF THE DRAWINGS

Illustrative, non-limiting example embodiments will be more clearly understood from the following detailed description in conjunction with the accompanying drawings.

DETAILED DESCRIPTION OF EXAMPLE EMBODIMENTS

Figure 1:
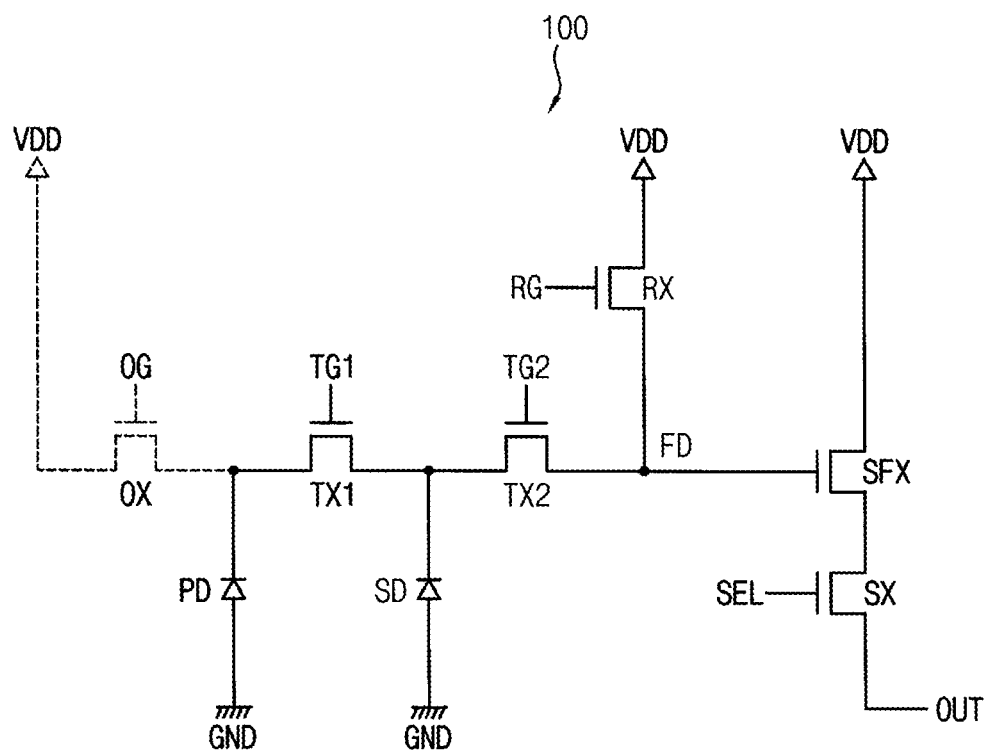
FIG. 1 is a circuit diagram illustrating a unit pixel included in a global shutter image sensor according to an example embodiment.

Various example embodiments will be described more fully with reference to the accompanying drawings, in which some example embodiments are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of inventive concepts. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a unit pixel included in a global shutter image sensor according to an example embodiment.

Referring to FIG. 1, an example of each unit pixel 100 included in the global shutter image sensor is illustrated in FIG. 1. The unit pixel 100 may include a photoelectric conversion device PD, a charge storage device SD, a first transfer transistor TX1, a second transfer transistor TX2, a reset transistor RX, a sensing transistor SFX, and a select transistor SX. In some example embodiments, the unit pixel 100 may further include an overflow transistor OX.

The photoelectric conversion device PD may receive incident light to convert the incident light into charges, and may accumulate the charges to generate accumulated charges. The photoelectric conversion device PD may include a first electrode connected to a low power voltage GND and a second electrode coupled to a first electrode of the first transfer transistor TX1. For example, the low power voltage GND may be a ground voltage. However, the low power voltage GND is not limited thereto. In an example embodiment, the photoelectric conversion device PD may be a photodiode, a phototransistor, a pinned photodiode, etc. In some example embodiments, when the unit pixel 100 further includes the overflow transistor OX, the second electrode of the photoelectric conversion device PD may be connected to a first electrode of the overflow transistor OX. The charge storage device SD may store the accumulated charges that are generated by the photoelectric conversion device PD. That is, when the accumulated charges are transferred from the photoelectric conversion device PD to the charge storage device SD as the first transfer transistor TX1 turns on, the charge storage device SD may store the accumulated charges until the second transfer transistor TX2 turns on. The charge storage device SD may include a first electrode connected between a second electrode of the first transfer transistor TX1 and a first electrode of the second transfer transistor TX2 and a second electrode connected to the low power voltage GND. In an example embodiment, the charge storage device SD may be a storage diode, etc.

The first transfer transistor TX1 may be connected between the photoelectric conversion device PD and the charge storage device SD. The first transfer transistor TX1 may operate based on a first transfer signal TG1. Specifically, the first transfer transistor TX1 may include the first electrode connected to the second electrode of the photoelectric conversion device PD, the second electrode connected to the first electrode of the charge storage device SD, and a gate electrode to which the first transfer signal TG1 is applied. When the first transfer signal TG1 has a first level (e.g., a logic 'high' level), the first transfer transistor TX1 may turn on. Thus, the accumulated charges generated by the photoelectric conversion device PD may be transferred to the charge storage device SD. The second transfer transistor TX2 may be connected between the charge storage device SD and a floating diffusion node FD. The second transfer transistor TX2 may operate based on a second transfer signal TG2. Specifically, the second transfer transistor TX2 may include the first electrode connected to the first electrode of the charge storage device SD, a second electrode connected to the floating diffusion node FD, and a gate electrode to which the second transfer signal TG2 is applied. When the second transfer signal TG2 has a first level (e.g., a logic 'high' level), the second transfer transistor TX2 may turn on. Thus, the accumulated charges stored in the charge storage device SD may be transferred to the floating diffusion node FD.

The reset transistor RX may be connected between the floating diffusion node FD and a high power voltage VDD. The reset transistor RX may operate based on a reset signal RG. Specifically, the reset transistor RX may include a first electrode connected to the high power voltage VDD, a second electrode connected to the floating diffusion node FD, and a gate electrode to which the reset signal RG is applied. When the reset signal RG has a first level (e.g., a logic 'high' level), the reset transistor RX may turn on. Thus, the floating diffusion node FD, the charge storage device SD, and/or the photoelectric conversion device PD may be reset (or, initialized). The sensing transistor SFX may be connected between the high power voltage VDD and a select transistor SX. The sensing transistor SFX may operate based on the accumulated charges that are transferred to the floating diffusion node FD. Specifically, the sensing transistor SFX may include a first electrode connected to the high power voltage VDD, a second electrode connected to a first electrode of the select transistor SX, and a gate electrode connected to the floating diffusion node FD. Thus, the sensing transistor SFX may turn on based on the accumulated charges that are transferred to the floating diffusion node FD.

The select transistor SX may be connected between an output terminal OUT and the sensing transistor SFX. The select transistor SX may operate based on a row select signal SEL. Specifically, the select transistor SX may include the first electrode connected to the second electrode of the sensing transistor SFX, a second electrode connected to the output terminal OUT, and a gate electrode to which the row select signal SEL is applied. When the row select signal SEL has a first level (e.g., a logic 'high' level), the select transistor SX may turn on. Thus, an electric signal corresponding to the accumulated charges that are transferred to the floating diffusion node FD may be output at the output terminal OUT. The overflow transistor OX may be connected between the high power voltage VDD and the photoelectric conversion device PD. The overflow transistor OX may operate based on an overflow signal OG. Specifically, the overflow transistor OX may include the first electrode connected to the second electrode of the photoelectric conversion device PD, a second electrode connected to the high power voltage VDD, and a gate electrode to which the overflow signal OG is applied. When the overflow signal OG has a first level (e.g., a logic 'high' level), the overflow transistor OX may turn on. Thus, the accumulated charges may be prevented from overflowing in the photoelectric conversion device PD.

In the global shutter image sensor, during a photoelectric conversion period of the global shutter image sensor, all unit pixels 100 (i.e., all photoelectric conversion devices PD of the unit pixels 100) may concurrently convert the incident light to the charges, and may concurrently generate the accumulated charges by accumulating the charges. That is, during the photoelectric conversion period of the global shutter image sensor, the first transfer signal TG1 having a second level (e.g., a logic 'low' level) may be concurrently applied to the unit pixels 100. Subsequently, as the first transfer signal TG1 having a first level (e.g., a logic 'high' level) is concurrently applied to the unit pixels 100, the accumulated charges generated by the photoelectric conversion devices PD may be concurrently stored in the charge storage devices SD of the unit pixels 100. On the other hand, during a read-out period of the global shutter image sensor, an electric signal may be sequentially output from the unit pixels 100 according to scan sequences of the unit pixels 100 (i.e., scan sequences of scan-lines connected to the unit pixels 100). That is, the electric signal may not be concurrently output from the unit pixels 100. Since the second transfer signal TG2 having a first level (e.g., a logic 'high' level) is sequentially applied to the unit pixels 100 during the read-out period of the global shutter image sensor, the accumulated charges stored in the charge storage devices SD may be sequentially output to the floating diffusion nodes FD of the unit pixels 100 according to scan sequences of the unit pixels 100. Thus, light noise due to a leakage current, a dark current, etc. may be caused while the accumulated charges generated by the photoelectric conversion devices PD are stored in the charge storage devices SD in the unit pixels 100. As a result, an amount of the light noise (e.g., a leakage current, a dark current, etc.) may differ according to scan sequences of the unit pixels 100, and thus image quality degradation may occur in the global shutter image sensor.

Figure 2:
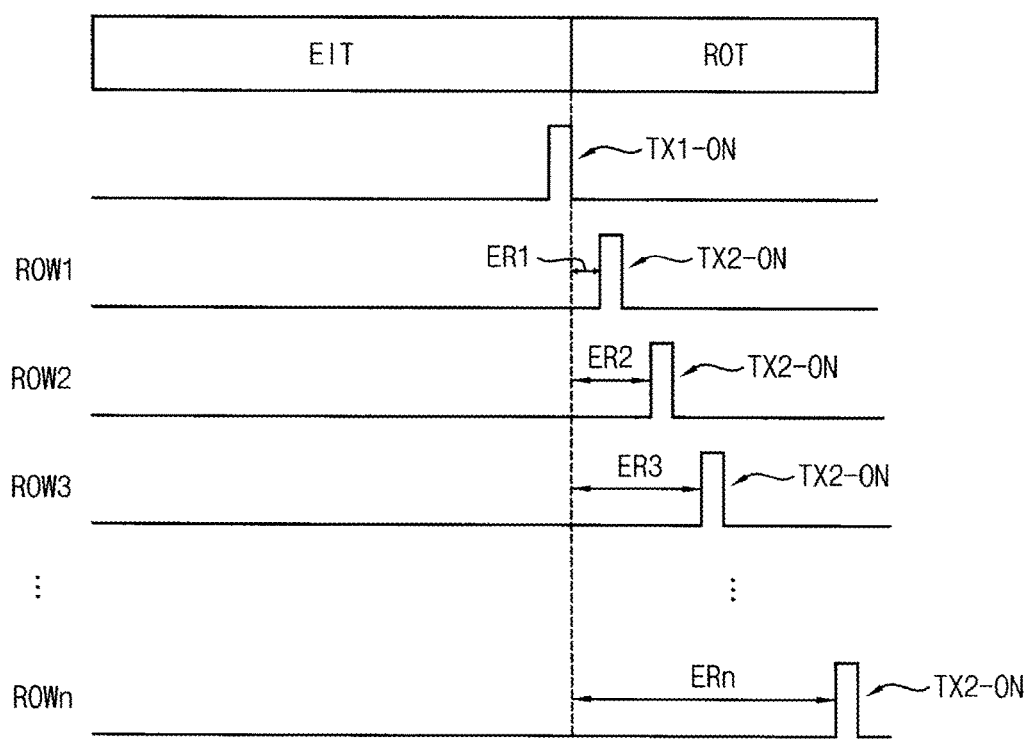
FIG. 2 is a timing diagram illustrating an example in which light noise is caused in the unit pixel of FIG. 1.
Figure 3A:
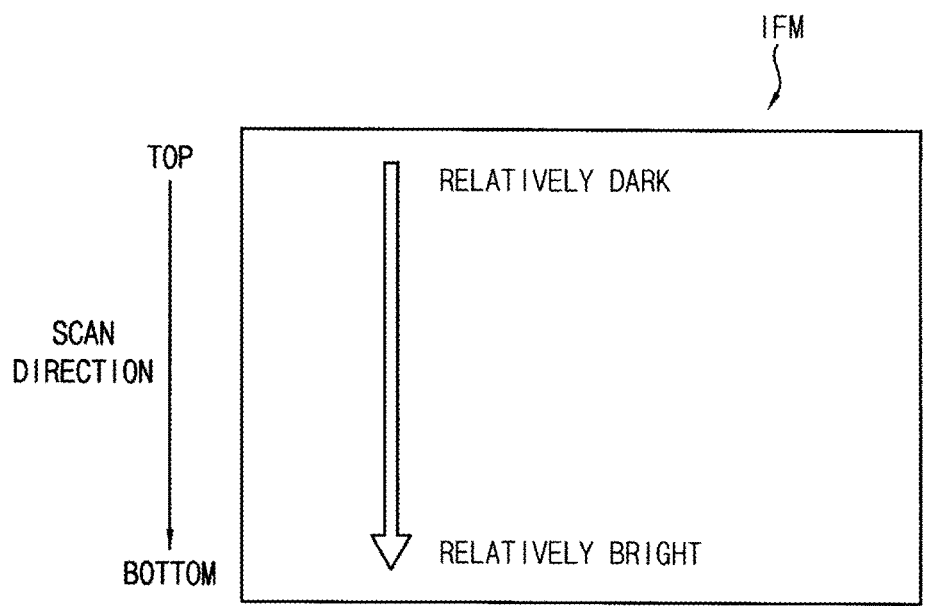
FIGS. 3A and 3B are diagrams illustrating an example in which image quality degradation due to light noise is caused in the unit pixel of FIG. 1.
Figure 3B:
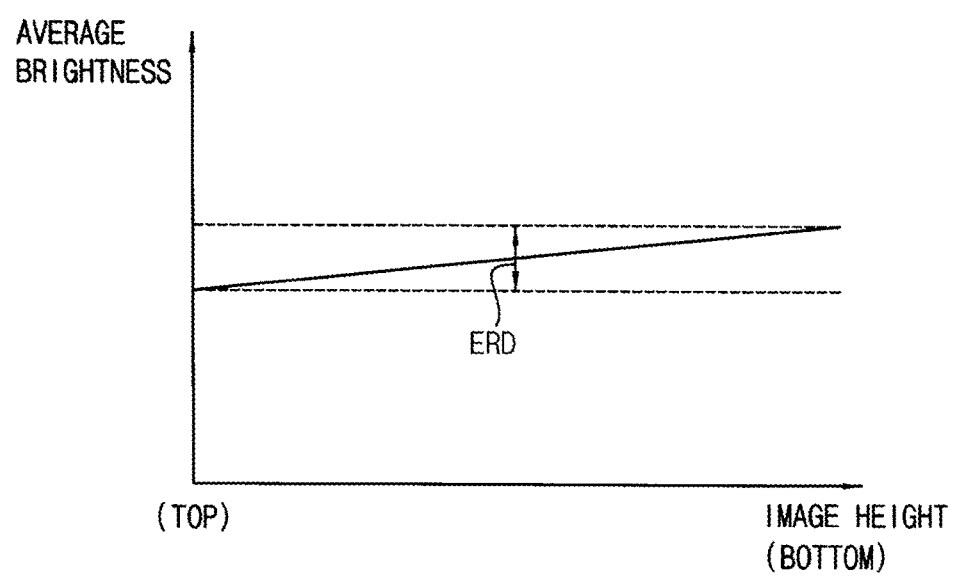

FIG. 2 is a timing diagram illustrating an example in which light noise is caused in the unit pixel of FIG. 1. FIGS. 3A and 3B are diagrams illustrating an example in which image quality degradation due to light noise is caused in the unit pixel of FIG. 1.

Referring to FIGS. 2 through 3B, it is illustrated in FIGS. 2 through 3B that an amount of light noise differs according to scan sequences of the unit pixels 100 (i.e., according to scan-lines connected to the unit pixels 100). As described above, during a photoelectric conversion period EIT of the global shutter image sensor, the accumulated charges may be concurrently generated by the photoelectric conversion devices PD of the unit pixels 100. Thus, when the first transfer signal TG1 having a first level (e.g., a logic 'high' level) is concurrently applied to the unit pixels 100 (i.e., indicated as TX1-ON), the accumulated charges generated by the photoelectric conversion devices PD may be concurrently stored in the charge storage devices SD of the unit pixels 100. On the other hand, during the read-out period ROT of the global shutter image sensor, the accumulated charges stored in the charge storage devices SD may be sequentially output to the floating diffusion nodes FD of the unit pixels 100 according to scan sequences of the unit pixels 100. That is, the second transfer signal TG2 having a first level (e.g., a logic 'high' level) may be sequentially applied to the unit pixels 100 (i.e., indicated as TX2-ON). Thus, the electric signal corresponding to the accumulated charges stored in the charge storage devices SD may be sequentially output from the unit pixels 100 according to scan sequences of the unit pixels 100 during the read-out period ROT of the global shutter image sensor.

As illustrated in FIG. 2, the unit pixels 100 of the global shutter image sensor may be connected to first through (n)th scan-lines ROW1 through ROWn, where n is an integer greater than or equal to 2. Here, when a scan operation is sequentially performed from the first scan-line ROW1 located at a top side TOP of the global shutter image sensor to the (n)th scan-line ROWn located at a bottom side BOTTOM of the global shutter image sensor (i.e., indicated as SCAN DIRECTION), the electric signal corresponding to the accumulated charges stored in the charge storage devices SD may be sequentially output from the unit pixels 100 in the sequence from the unit pixels 100 connected to the first scan-line ROW1 to some unit pixels 100 connected to the (n)th scan-line ROWn. In this case, a time ERn during which the accumulated charges generated by the photoelectric conversion devices PD are stored in the charge storage devices SD of the unit pixels 100 connected to the (n)th scan-line ROWn may be relatively long. In addition, a time ER1 during which the accumulated charges generated by the photoelectric conversion devices PD are stored in the charge storage devices SD of the unit pixels 100 connected to the first scan-line ROW1 may be relatively short. As a result, an amount of the light noise may be relatively small in the unit pixels 100 connected to the first scan-line ROW1, whereas an amount of the light noise may be relatively large in the unit pixels 100 connected to the (n)th scan-line ROWn. In other words, an amount of the light noise (e.g., a leakage current, a dark current, etc.) may differ according to scan sequences of the unit pixels 100, and thus image quality degradation may occur in the global shutter image sensor.

For example, as illustrated in FIGS. 3A and 3B, when a scan operation is sequentially performed from the first scan-line ROW1 to the (n)th scan-line ROWn (i.e., indicated as SCAN DIRECTION), a top side TOP of an image IFM may be relatively dark because an amount of the light noise is relatively small in the unit pixels 100 connected to upper scan-lines including the first scan-line ROW1, but a bottom side BOTTOM of the image IFM may be relatively bright because an amount of the light noise is relatively large in the unit pixels 100 connected to lower scan-lines including the (n)th scan-line ROWn. Thus, under the same conditions, an average-brightness difference ERD may be caused by the light noise of which an amount differs according to scan sequences of the unit pixels 100 (i.e., according to locations on the image IFM). In addition, the average-brightness difference ERD may result in image quality degradation.

To prevent this problem, an image sensor according to inventive concepts may perform an additional correlated double sampling operation for reading out a light noise signal as well as a correlated double sampling operation for reading out an image signal, may generate a multiplied value by multiplying the light noise signal by a compensation ratio that is determined according to a scan sequence of the unit pixel 100, and may generate a compensated image signal by subtracting the multiplied value from the image signal. Therefore, the image sensor according to inventive concepts may prevent the image quality degradation due to the light noise.

Figure 4:
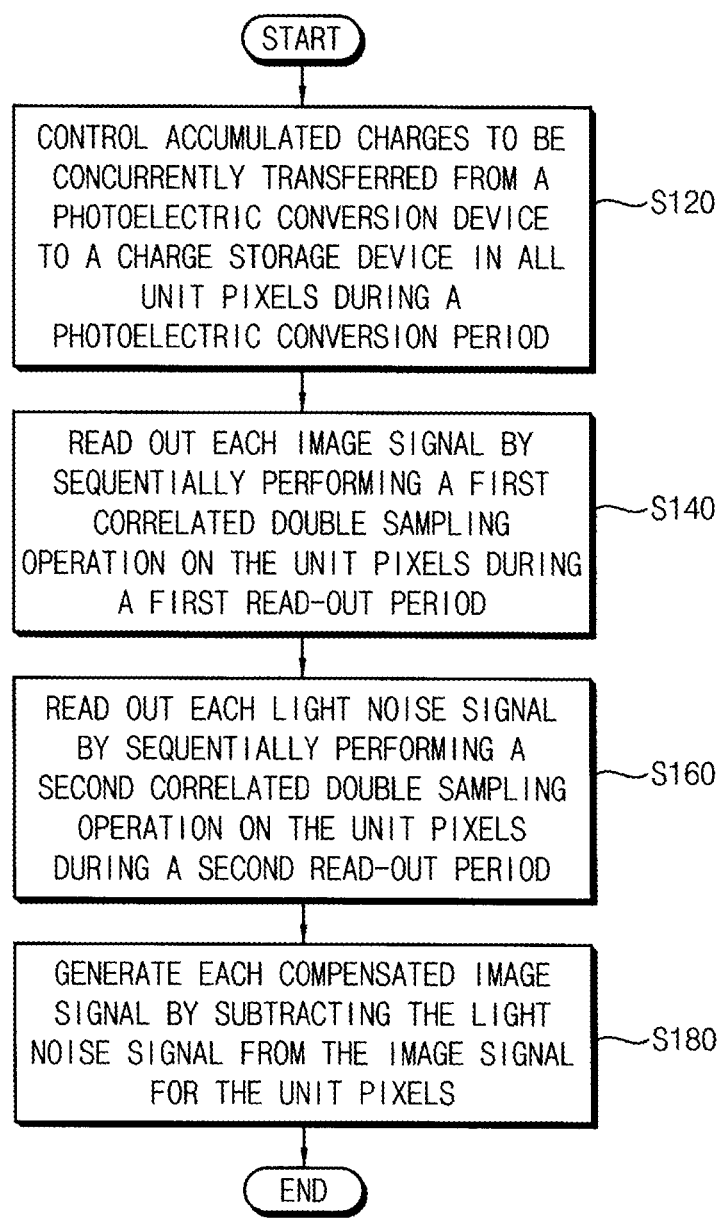
FIG. 4 is a flowchart illustrating a method of driving an image sensor according to an example embodiment.
Figure 5:
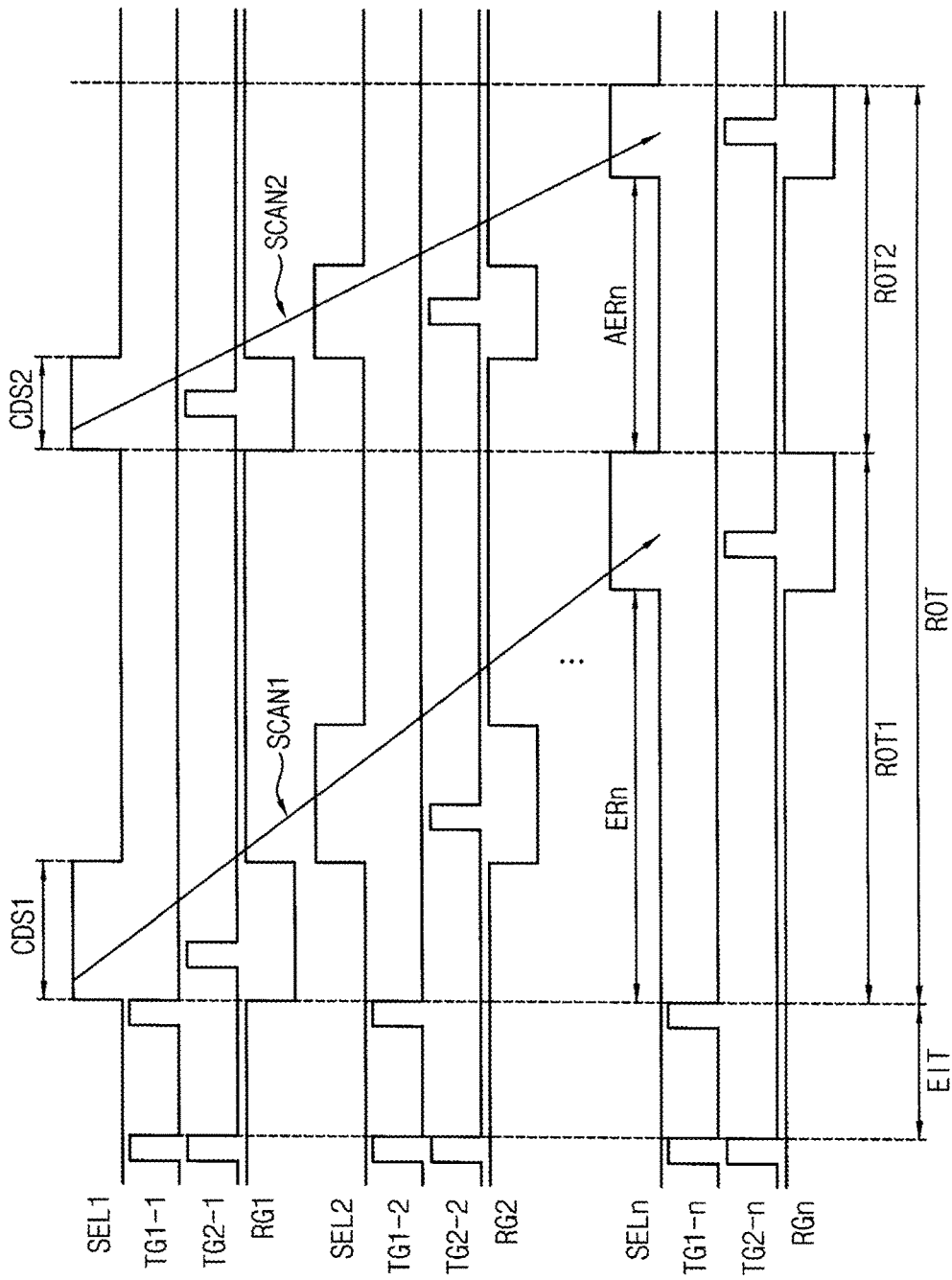
FIG. 5 is a timing diagram illustrating a photoelectric conversion period, a first read-out period, and a second read-out period that are performed by the method of FIG. 4.
Figure 6:
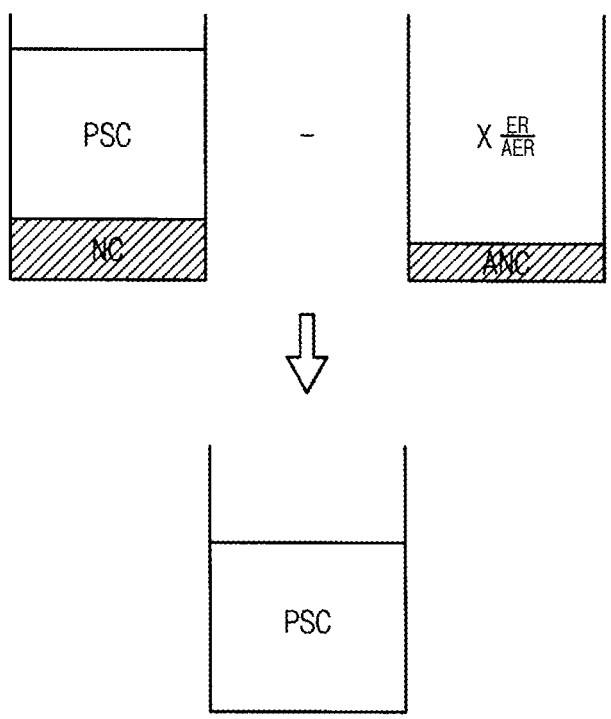
FIG. 6 is a diagram illustrating an example in which light noise is eliminated by the method of FIG. 4.

FIG. 4 is a flowchart illustrating a method of driving an image sensor according to an example embodiment. The steps shown in FIG. 4 may be performed by an image sensor (e.g., an image sensor 500, shown in FIG. 9), for example. FIG. 5 is a timing diagram illustrating a photoelectric conversion period, a first read-out period, and a second read-out period that are performed by the method of FIG. 4. FIG. 6 is a diagram illustrating an example in which light noise is eliminated by the method of FIG. 4.

Referring to FIGS. 4 through 6, the method of FIG. 4 may drive a global shutter image sensor in which each unit pixel 100 transfers accumulated charges generated by a photoelectric conversion device PD into a floating diffusion node FD via a charge storage device SD. Specifically, the method of FIG. 4 may control the accumulated charges to be concurrently transferred from the photoelectric conversion device PD to the charge storage device SD in all unit pixels 100 during a photoelectric conversion period EIT (S120), may read out each image signal PSC+NC (S140) by sequentially performing a first correlated double sampling operation on the unit pixels 100 according to scan sequences of the unit pixels 100 (i.e., according to scan-lines connected to the unit pixels 100) during a first read-out period ROT1 (i.e., indicated as SCAN1), may read out each light noise signal ANC (S160) by sequentially performing a second correlated double sampling operation on the unit pixels 100 according to scan sequences of the unit pixels 100 during a second read-out period ROT2 following the first read-out period ROT1 (i.e., indicated as SCAN2), and may generate each compensated image signal PSC by subtracting the light noise signal ANC from the image signal PSC+NC for the unit pixels (S180).

The method of FIG. 4 may control the accumulated charges to be concurrently transferred from the photoelectric conversion device PD to the charge storage device SD in the unit pixels 100 during the photoelectric conversion period EIT (S120). In an example embodiment, as illustrated in FIGS. 1 and 5, the method of FIG. 4 may turn on the first transfer transistor TX1, the second transfer transistor TX2, and the reset transistor RX by applying first transfer signals TG1-1 through TG1-*n* having a first level (e.g., a logic 'high' level), second transfer signals TG2-1 through TG2-*n* having a first level (e.g., a logic 'high' level), and reset signals RG1 through RG*n* having a first level (e.g., a logic 'high' level) to all unit pixels 100 just before the photoelectric conversion period EIT. As a result, the floating diffusion node FD, the charge storage device SD and/or the photoelectric conversion device PD may be reset (or, initialized) in the unit pixels 100. Subsequently, the method of FIG. 4 may turn off the first transfer transistor TX1 and the second transfer transistor TX2 by applying the first transfer signals TG1-1 through TG1-*n* having a second level (e.g., a logic 'low' level) and the second transfer signals TG2-1 through TG2-*n* having a second level (e.g., a logic 'low' level) to all unit pixels 100 during the photoelectric conversion period EIT. Thus, the photoelectric conversion device PD may convert incident light into charges, and may generate the accumulated charges by accumulating the charges in the unit pixels 100. Next, when the accumulated charges are generated by the photoelectric conversion devices PD of the unit pixels 100, the method of FIG. 4 may turn on the first transfer transistor TX1 and may turn off the second transfer transistor TX2 by applying the first transfer signals TG1-1 through TG1-*n* having a first level (e.g., a logic 'high' level) and the second transfer signals TG2-1 through TG2-*n* having a second level (e.g., a logic 'low' level) to all unit pixels 100. Thus, the charge storage device SD may store the accumulated charges generated by the photoelectric conversion device PD in the unit pixels 100.

The method of FIG. 4 may read out the image signal PSC+NC (S140) by sequentially performing the first correlated double sampling operation on the unit pixels 100 according to scan sequences of the unit pixels 100 (i.e., according to scan-lines connected to the unit pixels 100) during a first read-out period ROT1 (i.e., indicated as SCAN1). That is, as illustrated in FIG. 5, a first correlated double sampling period CDS1 during which the first correlated double sampling operation is performed may be shifted in every scan-line connected to the unit pixels 100. For example, when the global shutter image sensor includes first through (n)th scan-lines, the first read-out period ROT1 may correspond to a time during which the first correlated double sampling operation is completed (or, finished) on the first through (n)th scan-lines. In addition, the first correlated double sampling period CDS1 for the (k)th scan-line, where k is an integer between 1 and n, may correspond to a time during which a (k)th select signal SELk having a first level (e.g., a logic 'high' level) is applied to the unit pixels 100 connected to the (k)th scan-line. In an example embodiment, as illustrated in FIGS. 1 and 5, the method of FIG. 4 may turn on the select transistor SX and may turn off the reset transistor RX by applying the (k)th select signal SELk having a first level (e.g., a logic 'high' level) and the (k)th reset signal RGk having a second level (e.g., a logic 'low' level) to the unit pixels 100 connected to the (k)th scan-line during the first correlated double sampling period CDS1 during which the first correlated double sampling operation is performed on the (k)th scan-line. Here, since an effective signal component (e.g., a difference between a signal component and a reset component) is extracted based on the reset component and the signal component that are output from each unit pixel 100 when the correlated double sampling operation is performed on the unit pixel 100, the first correlated double sampling operation may include a first reset component output operation for outputting the reset component related to the image signal PSC+NC and a first signal component output operation for outputting the signal component related to the image signal PSC+NC. Therefore, when the first correlated double sampling operation is performed on the (k)th scan-line during the first correlated double sampling period CDS1, the first reset component output operation may be performed before the second transfer signal TG2-*k* having a first level (e.g., a logic 'high' level) is applied to the unit pixels 100 connected to the (k)th scan-line, and the first signal component output operation may be performed after the second transfer signal TG2-*k* having a first level (e.g., a logic 'high' level) is applied to the unit pixels 100 connected to the (k)th scan-line. That is, when the second transfer signal TG2-*k* having a first level (e.g., a logic 'high' level) is applied to the unit pixels 100 connected to the (k)th scan-line, the accumulated charges stored in the charge storage device SD may be transferred to the floating diffusion node FD in the unit pixels 100 connected to the (k)th scan-line.

The method of FIG. 4 may read out the light noise signal ANC (S160) by sequentially performing the second correlated double sampling operation on the unit pixels 100 according to scan sequences of the unit pixels 100 during the second read-out period ROT2 following the first read-out period ROT1 (i.e., indicated as SCAN2). That is, as illustrated in FIG. 5, a second correlated double sampling period CDS2 during which the second correlated double sampling operation is performed may be shifted in every scan-line connected to the unit pixels 100. For example, when the global shutter image sensor includes first through (n)th scan-lines, the second read-out period ROT2 may correspond to a time during which the second correlated double sampling operation is completed (or, finished) on the first through (n)th scan-lines. In addition, the second correlated double sampling period CDS2 for the (k)th scan-line may correspond to a time during which a (k)th select signal SELk having a first level (e.g., a logic 'high' level) is applied to the unit pixels 100 connected to the (k)th scan-line. In an example embodiment, as illustrated in FIGS. 1 and 5, the method of FIG. 4 may turn on the select transistor SX and may turn off the reset transistor RX by applying the (k)th select signal SELk having a first level (e.g., a logic 'high' level) and the (k)th reset signal RGk having a second level (e.g., a logic 'low' level) to the unit pixels 100 connected to the (k)th scan-line during the second correlated double sampling period CDS2 during which the second correlated double sampling operation is performed on the (k)th scan-line. Here, since an effective signal component is extracted based on the reset component and the signal component output from each unit pixel 100 when the correlated double sampling operation is performed on the unit pixel 100, the second correlated double sampling operation may include a second reset component output operation for outputting the reset component related to the light noise signal ANC and a second signal component output operation for outputting the signal component related to the light noise signal ANC. Therefore, when the second correlated double sampling operation is performed on the (k)th scan-line during the second correlated double sampling period CDS2, the second reset component output operation may be performed before the second transfer signal TG2-*k* having a first level (e.g., a logic 'high' level) is applied to the unit pixels 100 connected to the (k)th scan-line, and the second signal component output operation may be performed after the second transfer signal TG2-*k* having a first level (e.g., a logic 'high' level) is applied to the unit pixels 100 connected to the (k)th scan-line. That is, when the second transfer signal TG2-*k* having a first level (e.g., a logic 'high' level) is applied to the unit pixels 100 connected to the (k)th scan-line, charges corresponding to the light noise (e.g., a leakage current, a dark current, etc.) stored in the charge storage device SD may be transferred to the floating diffusion node FD in the unit pixels 100 connected to the (k)th scan-line.

The method of FIG. 4 may generate the compensated image signal PSC by subtracting the light noise signal ANC from the image signal PSC+NC for the unit pixels 100 (S180). In an example embodiment, the compensated image signal PSC may be generated by subtracting a multiplied value from the image signal PSC+NC, where the multiplied value is generated by multiplying the light noise signal ANC by a compensation ratio ER/AER that is determined according to a scan sequence of the unit pixel 100. Here, as illustrated in FIG. 5, a second read-out period ROT2 for outputting the light noise signal ANC may be set to be shorter than a first read-out period ROT1 for outputting the image signal PSC+NC. Thus, the second correlated double sampling period CDS2 during which the second correlated double sampling operation is performed may be set to be shorter than the first correlated double sampling period CDS1 during which the first correlated double sampling operation is performed. Generally, the light noise signal ANC is smaller than the image signal PSC+NC. Hence, it is unnecessary to equalize a ramp sweep for outputting the light noise signal ANC with a ramp sweep for outputting the image signal PSC+NC. Thus, a second signal component output period of the second correlated double sampling period CDS2 during which the second signal component output operation is performed may be set to be shorter than a first signal component output period of the first correlated double sampling period CDS1 during which the first signal component output operation is performed. On the other hand, the reset component of the first read-out period ROT1 is similar to (or, substantially the same as) the reset component of the second read-out period ROT2. Thus, a length of a second reset component output period of the second correlated double sampling period CDS2 during which the second reset component output operation is performed may be equal to a length of a first reset component output period of the first correlated double sampling period CDS1 during which the first reset component output operation is performed. Meanwhile, since frames-per-second (FPS) of the global shutter image sensor decreases as the second correlated double sampling operation for reading out the light noise signal ANC is performed, the second signal component output period of the second correlated double sampling period CDS2 during which the second signal component output operation is performed may be set shorter as the FPS of the global shutter image sensor increases, but may be set longer as the FPS of the global shutter image sensor decreases.

The compensation ratio ER/AER may increase as the unit pixel has a later scan sequence in one frame. In an example embodiment, the compensation ratio ER/AER may correspond to a value that is generated by dividing a first time ERk by a second time AERk, where the first time ERk corresponds to a time before the first correlated double sampling operation is performed on the (k)th scan-line in the first read-out period ROT1, and the second time AERk corresponds to a time between an end point of the first correlated double sampling operation on the (k)th scan-line and a start point of the second correlated double sampling operation on the (k)th scan-line. Thus, the compensation ratio ER/AER may be relatively small for the scan-line having an earlier scan sequence (e.g., the first scan-line located at the top side of the global shutter image sensor). On the other hand, the compensation ratio ER/AER may be relatively large for the scan-line having a later scan sequence in one frame (e.g., the (n)th scan-line located at the bottom side of the global shutter image sensor). As a result, as illustrated in FIG. 6, a multiplied value is generated by the image sensor by multiplying the light noise signal ANC by the compensation ratio ER/AER that is determined according to a scan sequence of the unit pixel 100, and the multiplied value may be substantially equal to an actual light noise signal NC included in the image signal PSC+NC. Hence, when the multiplied value that is substantially equal to the actual light noise signal NC included in the image signal PSC+NC is subtracted from the image signal PSC+NC, a compensated image signal PSC in which the light noise caused while the accumulated charges generated by the photoelectric conversion device PD are stored in the charge storage device SD are eliminated may be generated. As described above, when the image sensor performs the method of FIG. 4 drives, the image sensor may perform an additional correlated double sampling operation (i.e., the second correlated double sampling operation) for reading out the light noise signal ANC as well as a correlated double sampling operation (i.e., the first correlated double sampling operation) for reading out the image signal PSC+NC, may generate the multiplied value by multiplying the light noise signal ANC by the compensation ratio ER/AER that is determined according to a scan sequence of the unit pixel 100, and may generate the compensated image signal PSC by subtracting the multiplied value from the image signal PSC+NC. Thus, the method of FIG. 4 may prevent image quality degradation due to the light noise (e.g., a leakage current, a dark current, etc.) that is caused while the accumulated charges generated by the photoelectric conversion device PD are stored in the charge storage device SD.

In at least one example embodiment, the global shutter image sensor may set the second read-out period ROT2 for outputting the light noise signal ANC to be equal to or longer than the first read-out period ROT1 for outputting the image signal PSC+NC. In addition, the global shutter image sensor may set the second correlated double sampling period CDS2 during which the second correlated double sampling operation is performed to be equal to or longer than the first correlated double sampling period CDS1 during which the first correlated double sampling operation is performed. Further, the global shutter image sensor may set the second reset component output period of the second correlated double sampling period CDS2 during which the second reset component output operation is performed to be different from the first reset component output period of the first correlated double sampling period CDS1 during which the first reset component output operation is performed. Although the method of FIG. 4 is described above with reference to FIG. 5, the method of FIG. 4 is not limited to timings illustrated in FIG. 5 because the timings illustrated in FIG. 5 are examples. In addition, although it is described above that the second correlated double sampling operation for reading out the light noise signal ANC is performed once by the method of FIG. 4, the second correlated double sampling operation for reading out the light noise signal ANC may be performed several times by the method of FIG. 4. In this case, the method of FIG. 4 may accurately remove the light noise caused while the accumulated charges generated by the photoelectric conversion device PD are stored in the charge storage device SD. However, since the FPS of the global shutter image sensor decreases as the number of times the second correlated double sampling operation for reading out the light noise signal ANC is performed increases, the number of times the second correlated double sampling operation for reading out the light noise signal ANC is performed may be determined by considering the above trade-off relation.

Figure 7:
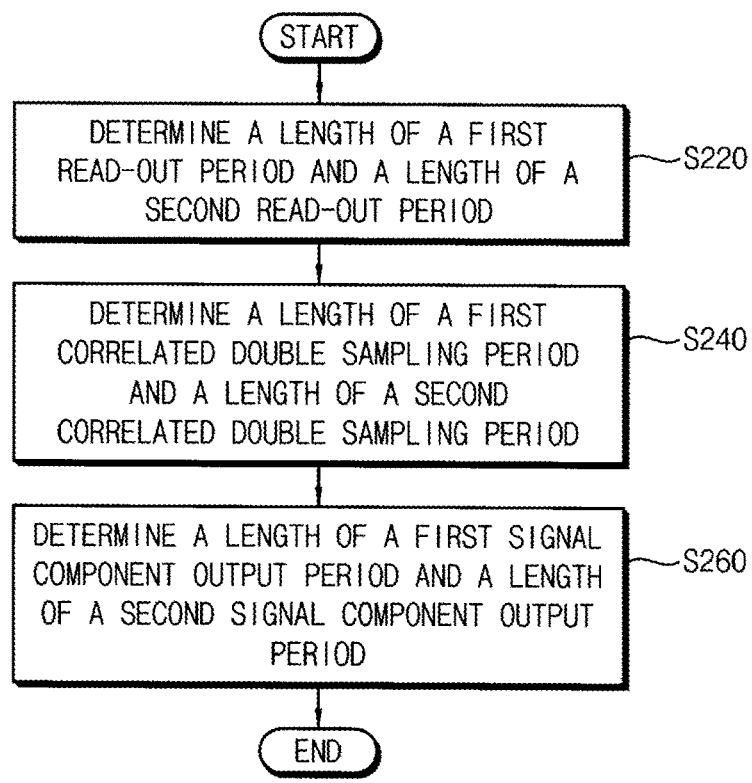
FIG. 7 is a flowchart illustrating an example in which a second correlated double sampling period is determined by the method of FIG. 4.
Figure 8:
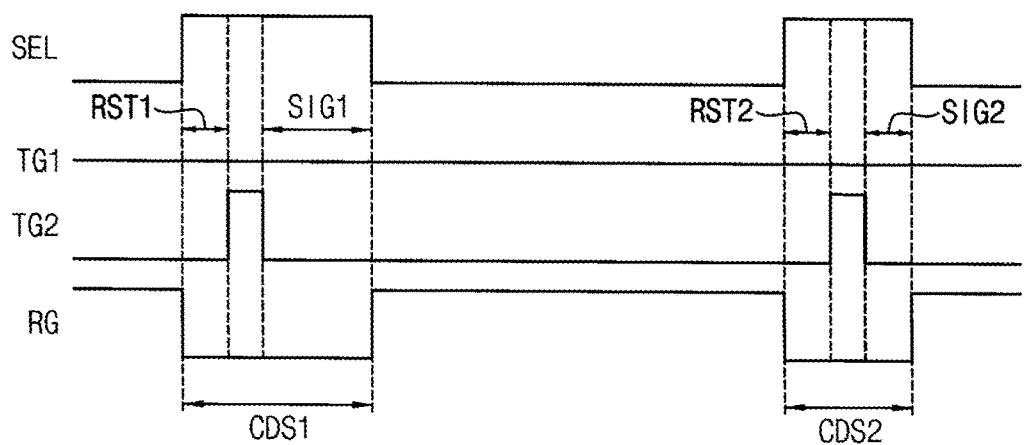
FIG. 8 is a diagram illustrating an example in which a second correlated double sampling period is determined by the method of FIG. 4.

FIG. 7 is a flowchart illustrating an example in which a second correlated double sampling period is determined by the image sensor using the method of FIG. 4. FIG. 8 is a timing diagram in accordance with the method shown in FIG. 7.

Referring to FIGS. 7 and 8, the method of FIG. 7 may determine a length of a first read-out period for outputting an image signal and a length of a second read-out period for outputting a light noise signal (S220). As illustrated in FIG. 8, the second read-out period for outputting the light noise signal may follow the first read-out period for outputting the image signal. In addition, the second read-out period for outputting the light noise signal may be set to be shorter than the first read-out period for outputting the image signal. Subsequently, the method of FIG. 7 may determine a length of a first correlated double sampling period CDS1 and a length of a second correlated double sampling period CDS2 (S240). For example, a sum of the first correlated double sampling periods CDS1 for all scan-lines of the global shutter image sensor may correspond to the first read-out period, and a sum of the second correlated double sampling periods CDS2 for all scan-lines of the global shutter image sensor may correspond to the second read-out period. In this case, when the second read-out period for outputting the light noise signal is set to be shorter than the first read-out period for outputting the image signal, the second correlated double sampling period CDS2 may be set to be shorter than the first correlated double sampling period CDS1. Next, the method of FIG. 7 may determine a length of a first signal component output period SIG1 and a length of a second signal component output period SIG2 (S260). Here, since an effective signal component is extracted based on a reset component and a signal component output from each unit pixel when the correlated double sampling operation is performed on the unit pixel, the first correlated double sampling operation may include the first reset component output operation for outputting the reset component related to the image signal and the first signal component output operation for outputting the signal component related to the image signal, and the second correlated double sampling operation may include the second reset component output operation for outputting the reset component related to the light noise signal and the second signal component output operation for outputting the signal component related to the light noise signal. In other words, the first correlated double sampling period CDS1 may include a first reset component output period RST1 and a first signal component output period SIG1, and the second correlated double sampling period CDS2 may include a second reset component output period RST2 and a second signal component output period SIG2.

Generally, since the light noise signal is smaller than the image signal, it is unnecessary to equalize a ramp sweep for outputting the light noise signal with a ramp sweep for outputting the image signal. In addition, since the reset component of the first read-out period is similar to (or, substantially the same as) the reset component of the second read-out period, it is unnecessary to unequalize a length of the first reset component output period RST1 of the first correlated double sampling period CDS1 with a length of the second reset component output period RST2 of the second correlated double sampling period CDS2. Thus, when the second correlated double sampling period CDS2 is set to be shorter than the first correlated double sampling period CDS1, the length of the first reset component output period RST1 may be substantially the same as the length of the second reset component output period RST2, and the second signal component output period SIG2 may be set to be shorter than the first signal component output period SIG1.

Compared to a situation in which the second correlated double sampling operation for reading out the light noise signal is not performed, the FPS of the global shutter image sensor may be reduced in a situation in which the second correlated double sampling operation for reading out the light noise signal is performed. For this reason, the second signal component output period SIG2 may be set to be relatively short in the second correlated double sampling period CDS2 as the FPS of the global shutter image sensor is relatively large, but may be set to be relatively long in the second correlated double sampling period CDS2 as the FPS of the global shutter image sensor is relatively small. In some example embodiments, the method of FIG. 4 may set the length of the first read-out period to be substantially the same as the length of the second read-out period. In this case, the length of the first correlated double sampling period CDS1 may be set to be substantially the same as the length of the second correlated double sampling period CDS2. As well, the length of the first signal component output period SIG1 may be set to be substantially the same as the length of the second signal component output period SIG2.

Figure 9:
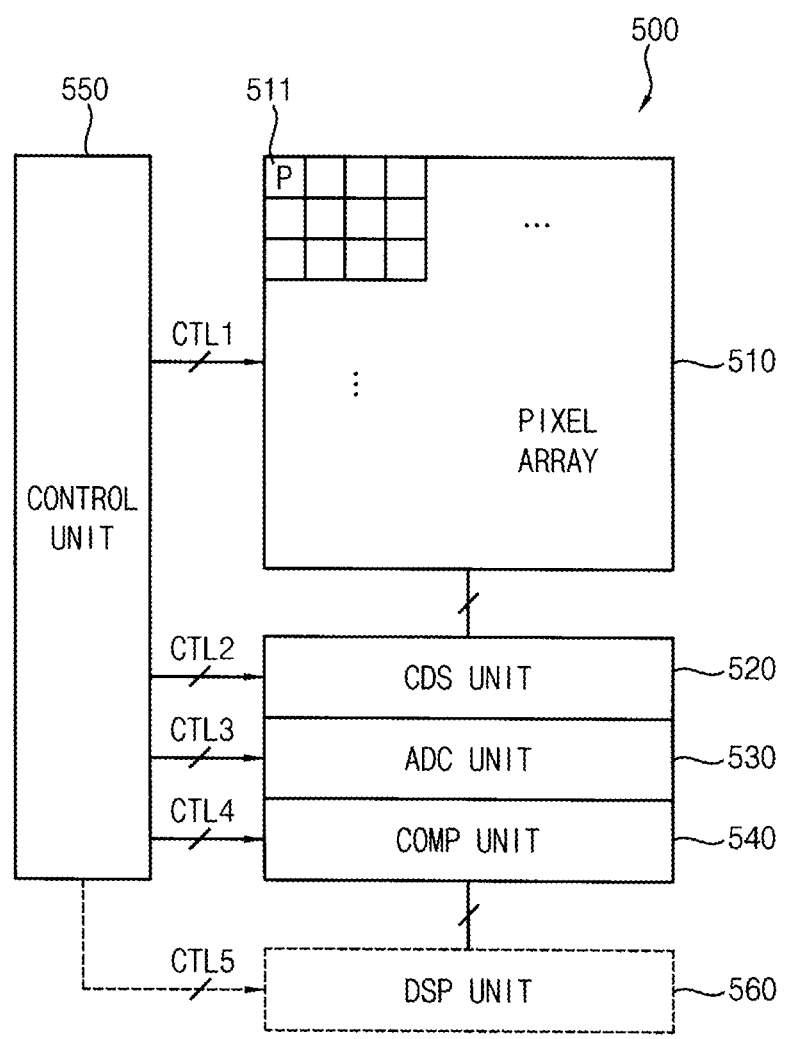
FIG. 9 is a block diagram illustrating an image sensor according to an example embodiment.
Figure 10:
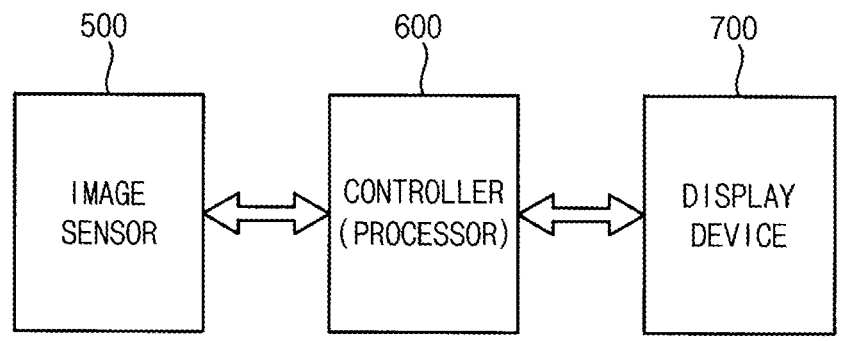
FIG. 10 is a block diagram illustrating an example in which the image sensor of FIG. 9 is connected to a display device via a controller.
Figure 11:
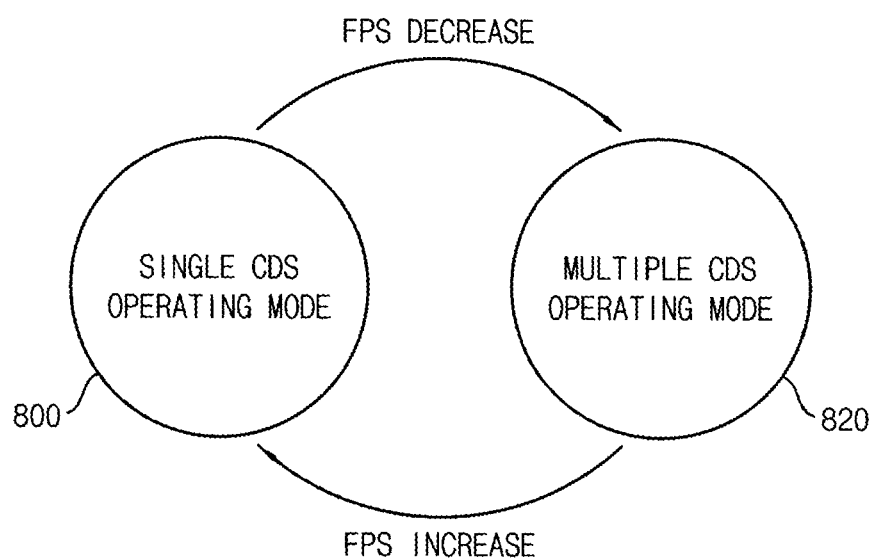
FIG. 11 is a diagram illustrating an operating mode of the image sensor of FIG. 9.

FIG. 9 is a block diagram illustrating an image sensor according to an example embodiment. FIG. 10 is a block diagram illustrating an example in which the image sensor of FIG. 9 is connected to a display device via a controller. FIG. 11 is a diagram illustrating an operating mode of the image sensor of FIG. 9.

Referring to FIGS. 9 through 11, the image sensor 500 may include a pixel array 510, a correlated double sampling unit 520, an analog-digital converting unit 530, and an image compensating unit 540. In some example embodiments, the image sensor 500 may further include a control unit 550 that controls the pixel array 510, the correlated double sampling unit 520, the analog-digital converting unit 530, and the image compensating unit 540. In some example embodiments, the image sensor 500 may further include a digital signal processing unit 560. Here, the image sensor 500 may be a global shutter image sensor.

The pixel array 510 may include at least one unit pixel 511 that generates accumulated charges corresponding to incident light during a photoelectric conversion period. In an example embodiment, the unit pixel 511 may include a photoelectric conversion device, a charge storage device, a first transfer transistor, a second transfer transistor, a reset transistor, a sensing transistor, and a select transistor. The photoelectric conversion device may convert the incident light to charges, and may generate the accumulated charges by accumulating the charges. The charge storage device may store the accumulated charges generated by the photoelectric conversion device. The first transfer transistor may be connected between the photoelectric conversion device and the charge storage device. Here, the first transfer transistor may operate based on a first transfer signal. The second transfer transistor may be connected between the charge storage device and a floating diffusion node. Here, the second transfer transistor may operate based on a second transfer signal. The reset transistor may be connected between the floating diffusion node and a high power voltage. The reset transistor may operate based on a reset signal. The sensing transistor may be connected to the high power voltage. Here, the sensing transistor may operate based on the accumulated charges that are transferred to the floating diffusion node. The select transistor may be connected between the sensing transistor and an output terminal. Here, the select transistor may operate based on a select signal. In example embodiments, the photoelectric conversion device may be a photodiode, a phototransistor, a pinned photodiode, etc., and the charge storage device may be a storage diode, etc. In some example embodiments, the unit pixel 511 may include an overflow transistor as well as the photoelectric conversion device, the charge storage device, the first transfer transistor, the second transfer transistor, the reset transistor, the sensing transistor, and the select transistor. The overflow transistor may be connected between the high power voltage and the photoelectric conversion device. Here, the overflow transistor may operate based on an overflow signal. Since the unit pixel 511 is described above with reference to FIG. 1, duplicated description will not be repeated.

The correlated double sampling unit 520 may perform a correlated double sampling operation by which an effective signal component is extracted based on a reset component and a signal component that are output from the unit pixel 511. Specifically, the correlated double sampling unit 520 may read out an image signal by extracting the effective signal component based on the signal component and the reset component related to the image signal during a first read-out period. In addition, the correlated double sampling unit 520 may read out a light noise signal by extracting the effective signal component based on the signal component and the reset component related to the light noise signal during a second read-out period. Here, the second read-out period for reading out the light noise signal may follow the first read-out period for reading out the image signal. In addition, the second read-out period for reading out the light noise signal may be set to be shorter than the first read-out period for reading out the image signal. Meanwhile, a second correlated double sampling period of the second read-out period for reading out the light noise signal may be set to be shorter than a first correlated double sampling period of the first read-out period for reading out the image signal. In addition, a second signal component output period of the second correlated double sampling period of the second read-out period for reading out the light noise signal may be set to be shorter than a first signal component output period of the first correlated double sampling period of the first read-out period for reading out the image signal. Further, a length of a second reset component output period of the second correlated double sampling period of the second read-out period for reading out the light noise signal may be set to be substantially the same as a length of a first reset component output period of the first correlated double sampling period of the first read-out period for reading out the image signal. Thus, the second signal component output period of the second correlated double sampling period of the second read-out period for reading out the light noise signal may be set shorter as the FPS of the image sensor 500 increases, but may be set longer as the FPS of the image sensor 500 decreases. Since these are described above with reference to FIGS. 4 through 8, duplicated description will not be repeated.

The analog-digital converting unit 530 may convert the image signal which is read out in the first read-out period into a first digital signal, and may convert the light noise signal which is read out in the second read-out period into a second digital signal. For this operation, the analog-digital converting unit 530 may include a plurality of analog-digital converters. The analog-digital converting unit 530 may perform a sequential analog-digital converting operation or a parallel analog-digital converting operation when converting an analog signal into a digital signal. In an example embodiment, as illustrated in FIG. 9, the correlated double sampling unit 520 may be located outside the analog-digital converting unit 530. In another example embodiment, the correlated double sampling unit 520 may be located inside the analog-digital converting unit 530. In an example embodiment, the correlated double sampling unit 520 may perform an analog correlated double sampling operation for extracting a difference between the signal component and the reset component that are output from the unit pixel 511. In another example embodiment, the correlated double sampling unit 520 may convert the signal component and the reset component that are output from the unit pixel 511 into respective digital signals, and may perform a digital correlated double sampling operation for extracting a difference between the digital signals. In still another example embodiment, the correlated double sampling unit 520 may perform a dual correlated double sampling operation including an analog correlated double sampling operation and a digital correlated double sampling operation.

The image compensating unit 540 may generate a compensated image signal by subtracting the light noise signal (i.e., converted into the first digital signal) output during the second read-out period from the image signal (i.e., converted into the second digital signal) output during the first read-out period. In an example embodiment, the image compensating unit 540 may generate the compensated image signal by subtracting a multiplied value from the image signal (i.e., converted into the first digital signal) output during the first read-out period, where the multiplied value is generated by multiplying the light noise signal (i.e., converted into the second digital signal) output during the second read-out period by a compensation ratio that is determined according to a scan sequence (i.e., a scan position) of the unit pixel 511. Here, the compensation ratio may be relatively large for the scan-line (i.e., the unit pixel 511) having a later scan sequence in one frame. In an example embodiment, the compensation ratio may correspond to a value that is generated by dividing a first time by a second time, where the first time corresponds to a time before the first correlated double sampling operation is performed on a scan-line in the first read-out period for outputting the image signal, and the second time corresponds to a time between an end point of the first correlated double sampling operation on the scan-line in the first read-out period and a start point of the second correlated double sampling operation on the scan-line in the second read-out period for outputting the light noise signal. Since these are described above with reference to FIGS. 4 through 8, duplicated description will not be repeated. In some example embodiments, various correction values may be applied to the compensation ratio, so that the multiplied value generated by multiplying the light noise signal by the compensation ratio may be adjusted to be substantially equal to an actual light noise signal included in the image signal. In some example embodiments, the image compensating unit 540 may be implemented inside the digital signal processing unit 560. As described above, the image sensor 500 may convert the image signal and the light noise signal into the first digital signal and the second digital signal, respectively, and then may generate the compensated image signal based on the first digital signal and the second digital signal.

The control unit 550 may control the pixel array 510, the correlated double sampling unit 520, the analog-digital converting unit 530, and the image compensating unit 540 (i.e., indicated as CTL1, CTL2, CTL3, and CTL4). For this operation, the control unit 550 may generate various signals (e.g., a clock signal, a timing control signal, etc.) that are used for operations of the pixel array 510, the correlated double sampling unit 520, the analog-digital converting unit 530, and the image compensating unit 540. However, for convenience of description, the control unit 550 is briefly illustrated (i.e., simplified) in FIG. 9. For example, the control unit 550 may include a vertical scan circuit, a horizontal scan circuit, a voltage generating circuit, etc. The vertical scan circuit may control a row addressing operation and a row scan operation of the pixel array 510. The horizontal scan circuit may control a column addressing operation and a column scan operation of the pixel array 510. The voltage generating circuit may generate a plurality of voltages that are used by the analog-digital converting unit 530. For example, the voltage generating circuit may include a logic control circuit, a phase locked loop (PLL), a timing control circuit, and a communication interface circuit, etc. In some example embodiments, when the image sensor 500 includes the digital signal processing unit 560, the control unit 550 may also control the digital signal processing unit 560 (i.e., indicated as CTL5).

The digital signal processing unit 560 may perform digital signal processing on the compensated image signal to output a final image signal. That is, the digital signal processing unit 560 may receive the compensated image signal (i.e., the digital signal) from the image compensating unit 540, and may perform the digital signal processing on the digital signal. For example, the digital signal processing unit 560 may perform an image interpolation, a color correction, a white balance, a gamma correction, a color conversion, etc. As illustrated in FIG. 10, the image sensor 500 may be connected to a display device 700 via a controller (or, processor) 600. Thus, the display device 700 may display an image based on the final image signal output from the digital signal processing unit 560. Although it is illustrated in FIG. 9 that the digital signal processing unit 560 is located inside the image sensor 500, the digital signal processing unit 560 may be located outside the image sensor 500. For example, the digital signal processing unit 560 may be implemented inside the controller 600, or may be implemented independently (or, separately) from the image sensor 500 and the controller 600.

In brief, when the image sensor 500 operates as the global shutter image sensor, the image sensor 500 may perform an additional correlated double sampling operation for reading out the light noise signal as well as a correlated double sampling operation for reading out the image signal, may generate the multiplied value by multiplying the light noise signal by the compensation ratio that is determined according to a scan sequence of the unit pixel 511, and may generate the compensated image signal by subtracting the multiplied value from the image signal. Thus, the image sensor 500 may prevent image quality degradation due to the light noise that is caused while accumulated charges generated by the photoelectric conversion device are stored in the charge storage device. Here, the image sensor 500 may operate in a single correlated double sampling mode 800 or in a multiple correlated double sampling mode 820. Specifically, in the single correlated double sampling mode 800 of the image sensor 500, the additional correlated double sampling operation for reading out the light noise signal is not performed. Thus, in the single correlated double sampling mode 800 of the image sensor 500, the image sensor 500 can increase the FPS of the image sensor 500 to a maximum FPS supported by the image sensor 500. As a result, the single correlated double sampling mode 800 of the image sensor 500 may be selected when a relatively high FPS is used or when little light noise occurs. On the other hand, in the multiple correlated double sampling mode 820 of the image sensor 500, the additional correlated double sampling operation for reading out the light noise signal is performed. Thus, in the multiple correlated double sampling mode 820 of the image sensor 500, the image sensor 500 cannot increase the FPS of the image sensor 500 to the maximum FPS supported by the image sensor 500. As a result, the multiple correlated double sampling mode 820 of the image sensor 500 may be selected when eliminating of the light noise such as a leakage current, a dark current, etc. is used or when much light noise occurs.

Figure 12:
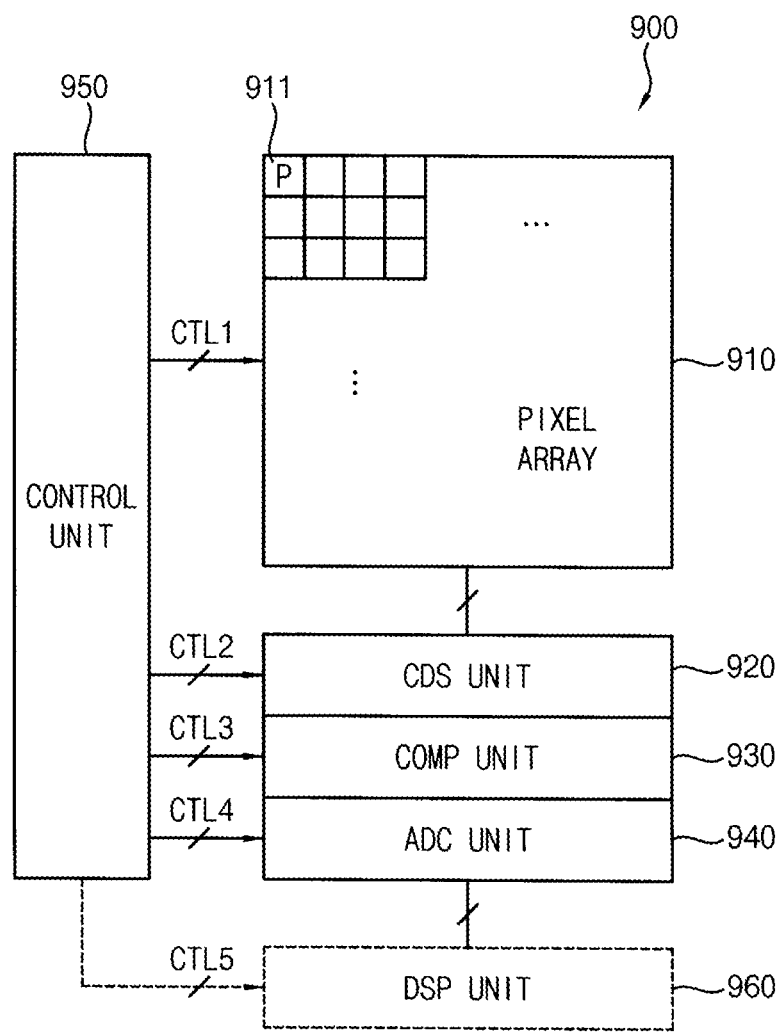
FIG. 12 is a block diagram illustrating an image sensor according to an example embodiment.

FIG. 12 is a block diagram illustrating an image sensor according to an example embodiment.

Referring to FIG. 12, the image sensor 900 may include a pixel array 910, a correlated double sampling unit 920, an image compensating unit 930, and an analog-digital converting unit 940. In some example embodiments, the image sensor 900 may further include a control unit 950 that controls the pixel array 910, the correlated double sampling unit 920, the image compensating unit 930, and the analog-digital converting unit 940. In an example embodiment, the image sensor 900 may further include a digital signal processing unit 960. Here, the image sensor 900 may be a global shutter image sensor.

The pixel array 910 may include at least one unit pixel 911 that generates accumulated charges corresponding to incident light during a photoelectric conversion period. In an example embodiment, the unit pixel 911 may include a photoelectric conversion device, a charge storage device, a first transfer transistor, a second transfer transistor, a reset transistor, a sensing transistor, and a select transistor. The photoelectric conversion device may convert the incident light to charges, and may generate the accumulated charges by accumulating the charges. The charge storage device may store the accumulated charges generated by the photoelectric conversion device. The first transfer transistor may be connected between the photoelectric conversion device and the charge storage device. Here, the first transfer transistor may operate based on a first transfer signal. The second transfer transistor may be connected between the charge storage device and a floating diffusion node. Here, the second transfer transistor may operate based on a second transfer signal. The reset transistor may be connected between the floating diffusion node and a high power voltage. The reset transistor may operate based on a reset signal. The sensing transistor may be connected to the high power voltage. Here, the sensing transistor may operate based on the accumulated charges that are transferred to the floating diffusion node. The select transistor may be connected between the sensing transistor and an output terminal. Here, the select transistor may operate based on a select signal. In example embodiments, the photoelectric conversion device may be a photodiode, a phototransistor, a pinned photodiode, etc., and the charge storage device may be a storage diode, etc. In some example embodiments, the unit pixel 911 may include an overflow transistor as well as the photoelectric conversion device, the charge storage device, the first transfer transistor, the second transfer transistor, the reset transistor, the sensing transistor, and the select transistor. The overflow transistor may be connected between the high power voltage and the photoelectric conversion device. Here, the overflow transistor may operate based on an overflow signal. Since the unit pixel 911 is described above with reference to FIG. 1, duplicated description will not be repeated.

The correlated double sampling unit 920 may perform a correlated double sampling operation by which an effective signal component is extracted based on a reset component and a signal component that are output from the unit pixel 911. Specifically, the correlated double sampling unit 920 may read out an image signal by extracting the effective signal component based on the signal component and the reset component related to the image signal during a first read-out period. In addition, the correlated double sampling unit 920 may read out a light noise signal by extracting the effective signal component based on the signal component and the reset component related to the light noise signal during a second read-out period. Here, the second read-out period for reading out the light noise signal may follow the first read-out period for reading out the image signal. In addition, the second read-out period for reading out the light noise signal may be set to be shorter than the first read-out period for reading out the image signal. Meanwhile, a second correlated double sampling period of the second read-out period for reading out the light noise signal may be set to be shorter than a first correlated double sampling period of the first read-out period for reading out the image signal. In addition, a second signal component output period of the second correlated double sampling period of the second read-out period for reading out the light noise signal may be set to be shorter than a first signal component output period of the first correlated double sampling period of the first read-out period for reading out the image signal. Further, a length of a second reset component output period of the second correlated double sampling period of the second read-out period for reading out the light noise signal may be set to be substantially the same as a length of a first reset component output period of the first correlated double sampling period of the first read-out period for reading out the image signal. Thus, the second signal component output period of the second correlated double sampling period of the second read-out period for reading out the light noise signal may be set shorter as the FPS of the image sensor 900 increases, but may be set longer as the FPS of the image sensor 900 decreases. Since these are described above with reference to FIGS. 4 through 8, duplicated description will not be repeated. In an example embodiment, the correlated double sampling unit 920 may be implemented inside the analog-digital converting unit 940.

The image compensating unit 930 may generate a compensated image signal by subtracting the light noise signal output during the second read-out period from the image signal output during the first read-out period. In an example embodiment, the image compensating unit 930 may generate the compensated image signal by subtracting a multiplied value from the image signal output during the first read-out period, where the multiplied value is generated by multiplying the light noise signal output during the second read-out period by a compensation ratio that is determined according to a scan sequence (i.e., a scan position) of the unit pixel 911. Here, the compensation ratio may be relatively large for the scan-line (i.e., the unit pixel 911) having a later scan sequence in one frame. In an example embodiment, the compensation ratio may correspond to a value that is generated by dividing a first time by a second time, where the first time corresponds to a time before the first correlated double sampling operation is performed on a scan-line in the first read-out period for outputting the image signal, and the second time corresponds to a time between an end point of the first correlated double sampling operation on the scan-line in the first read-out period and a start point of the second correlated double sampling operation on the scan-line in the second read-out period for outputting the light noise signal. Since these are described above with reference to FIGS. 4 through 8, duplicated description will not be repeated. In some example embodiments, various correction values may be applied to the compensation ratio, so that the multiplied value generated by multiplying the light noise signal by the compensation ratio may be adjusted to be substantially equal to an actual light noise signal included in the image signal. In some example embodiments, the image compensating unit 930 may be implemented inside the analog-digital converting unit 940. As described above, the image sensor 900 may generate the compensated image signal based on the image signal and the light noise signal, and then may convert the compensated image signal (i.e., an analog signal) into a digital signal.

The analog-digital converting unit 940 may convert the compensated image signal output from the image compensating unit 930 into a digital signal. For this operation, the analog-digital converting unit 940 may include a plurality of analog-digital converters. The analog-digital converting unit 940 may perform a sequential analog-digital converting operation or a parallel analog-digital converting operation when converting an analog signal into a digital signal. The control unit 950 may control the pixel array 910, the correlated double sampling unit 920, the image compensating unit 930, and the analog-digital converting unit 940 (i.e., indicated as CTL1, CTL2, CTL3, and CTL4). For this operation, the control unit 950 may generate various signals (e.g., a clock signal, a timing control signal, etc.) that are used for operations of the pixel array 910, the correlated double sampling unit 920, the image compensating unit 930, and the analog-digital converting unit 940. However, for convenience of description, the control unit 950 is briefly illustrated (i.e., simplified) in FIG. 12. For example, the control unit 950 may include a vertical scan circuit, a horizontal scan circuit, a voltage generating circuit, etc. The vertical scan circuit may control a row addressing operation and a row scan operation of the pixel array 910. The horizontal scan circuit may control a column addressing operation and a column scan operation of the pixel array 910. The voltage generating circuit may generate a plurality of voltages that are used by the analog-digital converting unit 940. For example, the voltage generating circuit may include a logic control circuit, a phase locked loop, a timing control circuit, and a communication interface circuit, etc. In some example embodiments, when the image sensor 900 includes the digital signal processing unit 960, the control unit 950 may also control the digital signal processing unit 960 (i.e., indicated as CTL5).

The digital signal processing unit 960 may perform a digital signal processing on the digital signal to output a final image signal. That is, the digital signal processing unit 960 may receive the digital signal from the analog-digital converting unit 940, and may perform the digital signal processing on the digital signal. For example, the digital signal processing unit 960 may perform an image interpolation, a color correction, a white balance, a gamma correction, a color conversion, etc. The image sensor 900 may be connected to a display device via a controller (or, processor). Thus, the display device may display an image based on the final image signal output from the digital signal processing unit 960. In brief, when the image sensor 900 operates as the global shutter image sensor, the image sensor 900 may perform an additional correlated double sampling operation for reading out the light noise signal as well as a correlated double sampling operation for reading out the image signal, may generate the multiplied value by multiplying the light noise signal by the compensation ratio that is determined according to a scan sequence of the unit pixel 911, and may generate the compensated image signal by subtracting the multiplied value from the image signal. Thus, the image sensor 900 may prevent image quality degradation due to the light noise that is caused while accumulated charges generated by the photoelectric conversion device are stored in the charge storage device. Here, the image sensor 900 may operate in a single correlated double sampling mode or in a multiple correlated double sampling mode.

Figure 13:
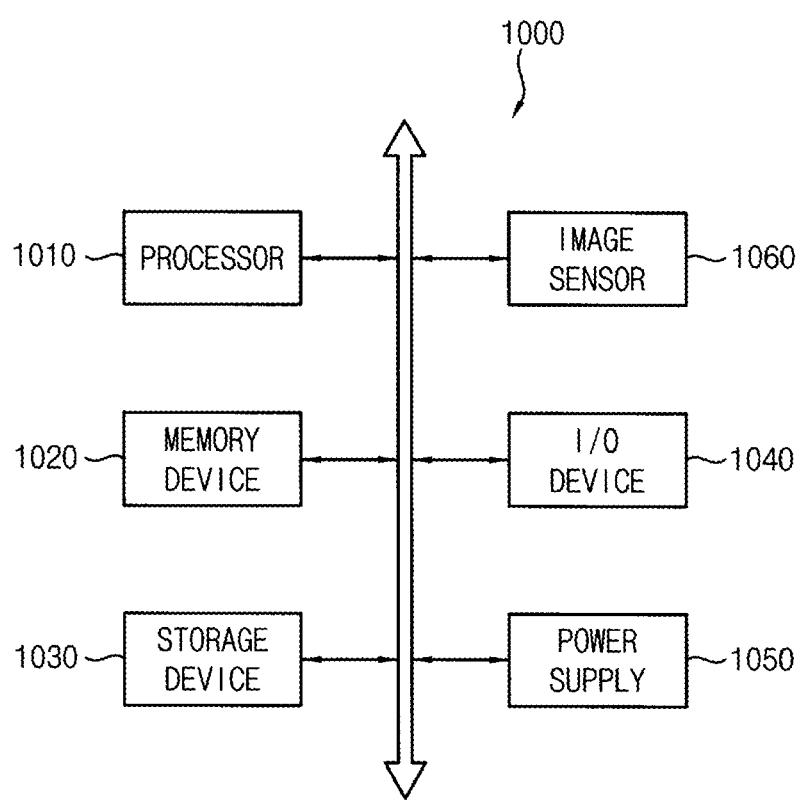
FIG. 13 is a block diagram illustrating a portable electronic device according to an example embodiment.
Figure 14A:
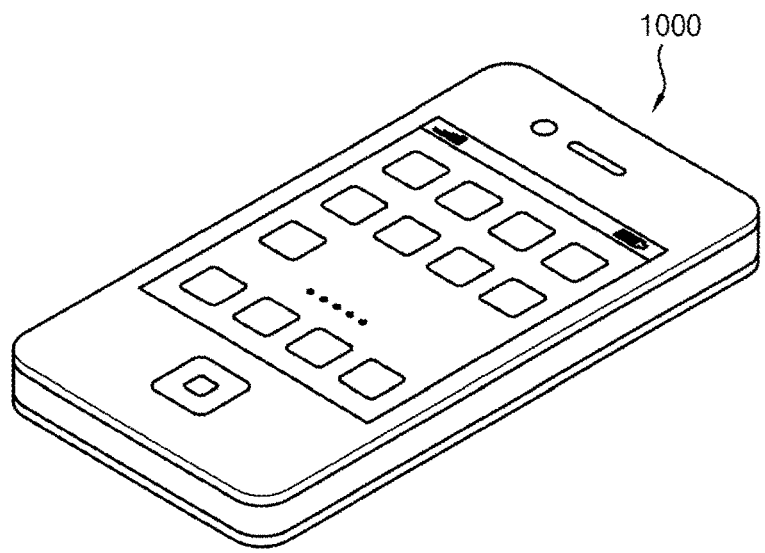
FIG. 14A is a diagram illustrating an example in which the portable electronic device of FIG. 13 is implemented as a smart phone.
Figure 14B:
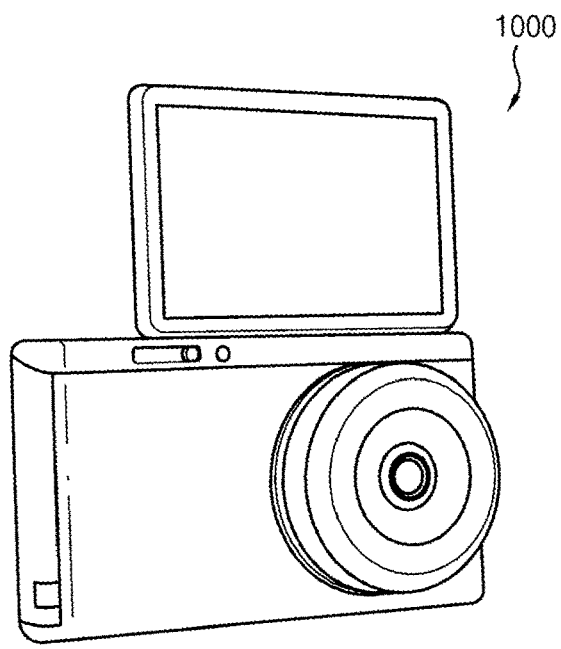
FIG. 14B is a diagram illustrating an example in which the portable electronic device of FIG. 13 is implemented as a digital camera.

FIG. 13 is a block diagram illustrating a portable electronic device according to an example embodiment. FIG. 14A is a diagram illustrating an example in which the portable electronic device of FIG. 13 is implemented as a smart phone. FIG. 14B is a diagram illustrating an example in which the portable electronic device of FIG. 13 is implemented as a digital camera.

Referring to FIGS. 13 through 14B, the portable electric device 1000 may include a processor 1010, a memory device 1020, a storage device 1030, an input/output (I/O) device 1040, a power supply 1050, and an image sensor 1060. Here, the image sensor 1060 may correspond to the image sensor 500 of FIG. 9 or the image sensor 900 of FIG. 12. In addition, the portable electric device 1000 may further include a plurality of ports for communicating a video card, a sound card, a memory card, a universal serial bus (USB) device, other electric devices, etc. In an example embodiment, as illustrated in FIG. 14A, the portable electronic device 1000 may be implemented as a smart phone. In another example embodiment, as illustrated in FIG. 14B, the portable electronic device 1000 may be implemented as a digital camera. Here, compared to a portable electronic device including a rolling shutter image sensor, the portable electronic device 1000 including a global shutter image sensor (i.e., the image sensor 500 of FIG. 9 or the image sensor 900 of FIG. 12) may prevent an image distortion (e.g., motion blur, jello effect, etc.) when performing an image capturing (e.g., still image shooting, moving image shooting, etc.). In addition, the portable electronic device 1000 including the global shutter image sensor may provide a high performance (or, high speed) continuous shooting function to users.

The processor 1010 may perform various computing functions. The processor 1010 may be a micro-processor, a central processing unit (CPU), etc. The processor 1010 may be coupled to the memory device 1020, the storage device 1030, and the I/O device 1040 via an address bus, a control bus, a data bus, etc. In some example embodiments, the processor 1010 may be coupled to an extended bus such as a peripheral component interconnection (PCI) bus. The memory device 1020 may store data for operations of the portable electric device 1000. For example, the memory device 1020 may include a volatile semiconductor memory device such as a dynamic random access memory (DRAM) device, a static random access memory (SRAM) device, a mobile DRAM, etc., and a non-volatile semiconductor memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc. The storage device 1030 may include a solid state drive (SSD) device, a hard disk drive (HDD) device, a CD-ROM device, etc.

The I/O device 1040 may include an input device such as a keyboard, a keypad, a touchpad, a touch-screen, a mouse device, etc., and an output device such as a display device, a printer, a speaker, etc. The power supply 1050 may provide power for operations of the portable electric device 1000.

The image sensor 1060 may be coupled to other components via the buses or other communication links. As described above, the image sensor 1060 may perform an additional correlated double sampling operation for reading out a light noise signal as well as a correlated double sampling operation for reading out an image signal, may generate a multiplied value by multiplying the light noise signal by a compensation ratio that is determined according to a scan sequence (i.e., a scan position) of the unit pixel, and may generate a compensated image signal by subtracting the multiplied value from the image signal. Thus, the image sensor 1060 may prevent image quality degradation due to light noise (e.g., a leakage current, a dark current, etc.) that is caused while accumulated charges generated by a photoelectric conversion device are stored in a charge storage device. For this operation, the image sensor 1060 may include a pixel array, a correlated double sampling unit, an image compensating unit, and an analog-digital converting unit. In some example embodiments, the image sensor 1060 may further include a control unit that controls the pixel array, the correlated double sampling unit, the image compensating unit, and the analog-digital converting unit. In some example embodiments, the image sensor 1060 may further include a digital signal processing unit. Here, the digital signal processing unit may be implemented inside the image sensor 1060, or may be implemented outside the image sensor 1060.

In an example embodiment, the pixel array may include at least one unit pixel that generates accumulated charges corresponding to incident light during a photoelectric conversion period. The correlated double sampling unit may perform a correlated double sampling operation for extracting an effective signal component based on a signal component and a reset component that are output from the unit pixel. Here, the correlated double sampling unit may read out an image signal during a first read-out period, and may read out a light noise signal during a second read-out period following the first read-out period. The analog-digital converting unit may convert the image signal into a first digital signal, and may convert the light noise signal into a second digital signal. The image compensating unit may generate a compensated image signal by subtracting a multiplied value from the first digital signal, where the multiplied value is generated by multiplying the second digital signal by a compensation ratio that is determined according to a scan sequence (or, a scan position) of the unit pixel. The control unit may control the pixel array, the correlated double sampling unit, the analog-digital converting unit, and the image compensating unit. The digital signal processing unit may perform a digital signal processing on the compensated image signal to output a final image signal. In brief, the image sensor 1060 may convert the image signal and the light noise signal into the first digital signal and the second digital signal, respectively, and then may generate the compensated image signal based on the first digital signal and the second digital signal.

In another example embodiment, the pixel array may include at least one unit pixel that generates accumulated charges corresponding to incident light during a photoelectric conversion period. The correlated double sampling unit may perform a correlated double sampling operation for extracting an effective signal component based on a signal component and a reset component that are output from the unit pixel. Here, the correlated double sampling unit may read out an image signal during a first read-out period, and may read out a light noise signal during a second read-out period following the first read-out period. The image compensating unit may generate a compensated image signal by subtracting a multiplied value from the image signal, where the multiplied value is generated by multiplying the light noise signal by a compensation ratio that is determined according to a scan sequences (or, a scan position) of the unit pixel. The analog-digital converting unit may convert the compensated image signal (i.e., an analog signal) into a digital signal. The control unit may control the pixel array, the correlated double sampling unit, the image compensating unit, and the analog-digital converting unit. The digital signal processing unit may perform a digital signal processing on the digital signal to output a final image signal. In brief, the image sensor 1060 may generate the compensated image signal based on the image signal and the light noise signal, and then may convert the compensated image signal into the digital signal.

In some example embodiments, the image sensor 1060 may be implemented by various packages such as Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flat-Pack (TQFP), Small Outline Integrated Circuit (SOIC), Shrink Small Outline Package (SSOP), Thin Small Outline Package (TSOP), Thin Quad Flat-Pack (TQFP), System In Package (SIP), Multi Chip Package (MCP), Wafer-level Fabricated Package (WFP), Wafer-Level Processed Stack Package (WSP). As described above, the portable electronic device 1000 including the image sensor 1060 may output a high-quality image. In an example embodiment, the image sensor 1060 and the processor 1010 may be integrated on one chip. In another example embodiment, the image sensor 1060 and the processor 1010 may be integrated on different chips, respectively. Although it is illustrated in FIGS. 14A and 14B that the portable electronic device 100 is implemented as the smart phone or the digital camera (e.g., a mirror-less digital camera, etc.), the portable electronic device 1000 is not limited thereto. That is, it should be understood that the portable electronic device 1000 can be interpreted as any electronic device including (or, using) the image sensor 1060. For example, the portable electronic device 1000 may be implemented as a cellular phone, a smart pad, a personal digital assistants (PDA), a portable multimedia player (PMP), etc.

Figure 15:
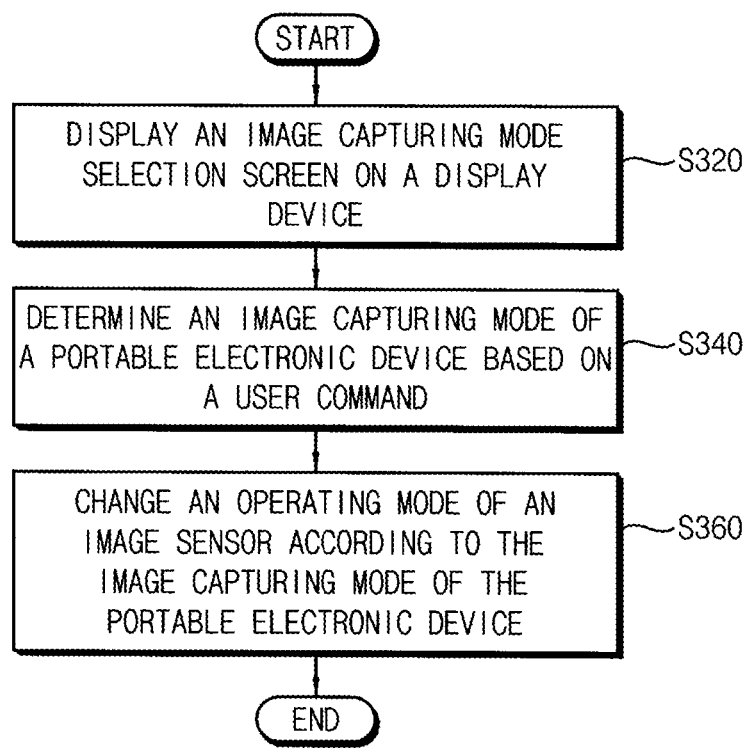
FIG. 15 is a flowchart illustrating an example in which an operating mode of an image sensor is determined in the portable electronic device of FIG. 13.

FIG. 15 is a flowchart illustrating an example in which an operating mode of an image sensor is determined in the portable electronic device of FIG. 13.

Referring to FIG. 15, the portable electronic device 1000 may display an image capturing mode selection screen on a display device (S320). For example, the image capturing mode selection screen may include a graphic (e.g., a text, an icon, etc.) indicating a high FPS mode in which setting the FPS of the image sensor 1060 to be high is preferred, a graphic (e.g., a text, an icon, etc.) indicating a light noise elimination mode in which eliminating light noise (e.g., a leakage current, a dark current, etc.) is preferred. Subsequently, the portable electronic device 1000 may determine an image capturing mode of the portable electronic device 1000 based on a user command (S340). For example, a user may input the user command by pushing (or, pressing) a button to select one of the graphics, or by touching one of the graphics on the display device to select one of the graphics. Next, the portable electronic device 1000 may change an operating mode of the image sensor 1060 according to the image capturing mode of the portable electronic device 1000 that is determined based on the user command (S360). For example, when a user selects the high FPS mode as the image capturing mode of the portable electronic device 1000, the operating mode of the image sensor 1060 may be changed to a single correlated double sampling mode. On the other hand, when a user selects the light noise elimination mode as the image capturing mode of the portable electronic device 1000, the operating mode of the image sensor 1060 may be changed to a multiple correlated double sampling mode. Although it is described above that the operating mode of the image sensor 1060 is determined in the portable electronic device 1000, a way of determining the operating mode of the image sensor 1060 in the portable electronic device 1000 is not limited thereto. For example, the portable electronic device 1000 may automatically (e.g., based on a predetermined algorithm) determine the operating mode of the image sensor 1060 according to an image capturing environment (i.e., regardless of the user command). That is, the portable electronic device 1000 may change the operating mode of the image sensor 1060 to the multiple correlated double sampling mode in an image capturing environment in which much light noise occurs, and may change the operating mode of the image sensor 1060 to the single correlated double sampling mode in an image capturing environment in which little light noise occurs.

Figure 16:
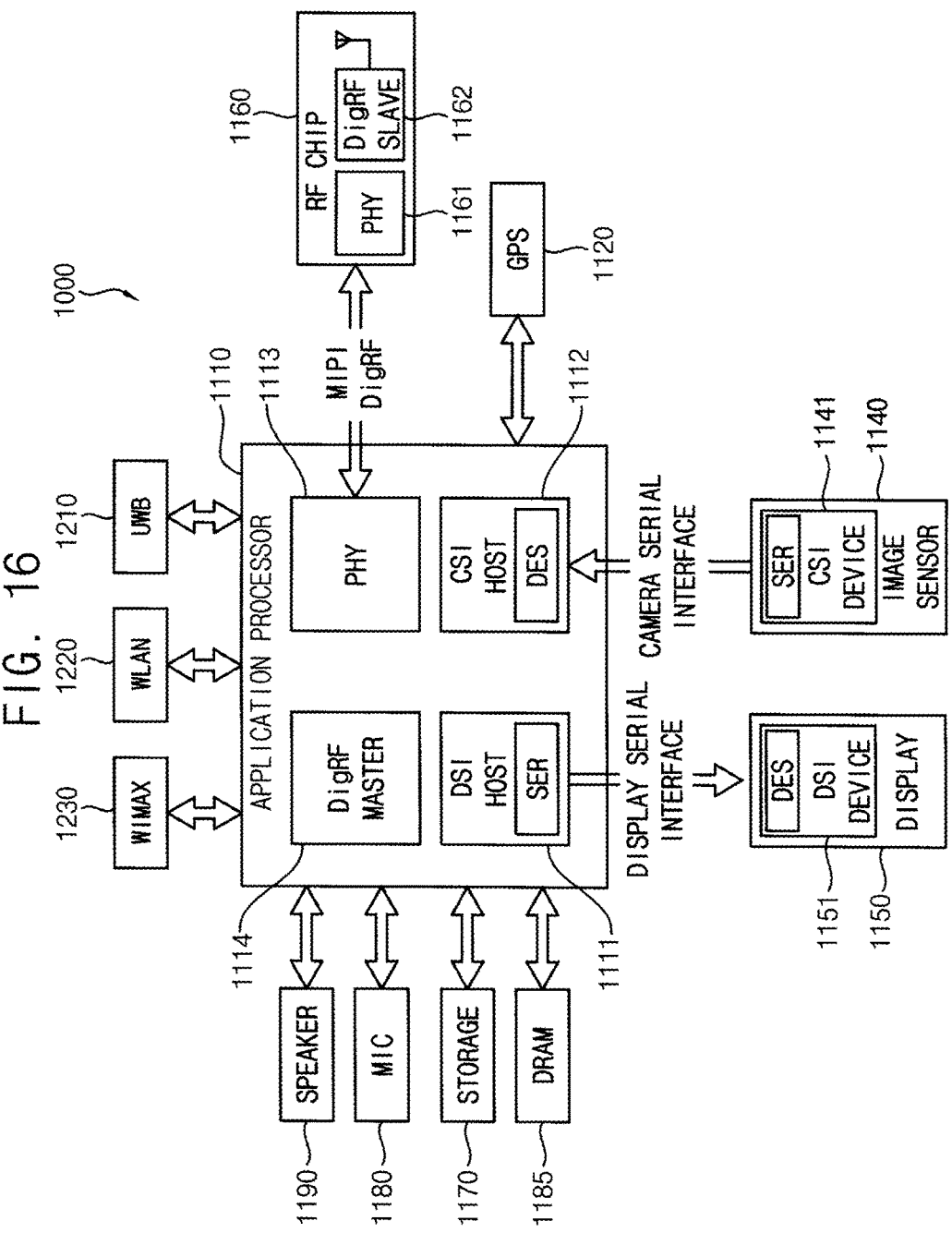
FIG. 16 is a block diagram illustrating an example of an interface that is used in the portable electronic device of FIG. 13.

FIG. 16 is a block diagram illustrating an example of an interface that is used in the portable electronic device of FIG. 13.

Referring to FIG. 16, the portable electronic device 1000 may be implemented by a data processing device that uses or supports a mobile industry processor interface (MIPI) interface (e.g., a mobile phone, a personal digital assistant (PDA), a portable multimedia player (PMP), a smart phone, etc.). The portable electronic device 1000 may include an application processor 1010, an image sensor 1140, a display device 1150, and other various input/output devices discussed in detail below. A CSI host 1112 of the application processor 1110 may perform a serial communication with a CSI device 1141 of the image sensor 1140 using a camera serial interface (CSI). In an example embodiment, the CSI host 1112 may include a light deserializer (DES), and the CSI device 1141 may include a light serializer (SER). A DSI host 1111 of the application processor 1110 may perform a serial communication with a DSI device 1151 of the display device 1150 using a display serial interface (DSI). In an example embodiment, the DSI host 1111 may include a light serializer (SER), and the DSI device 1151 may include a light deserializer (DES). The portable electronic device 1000 may further include a radio frequency (RF) chip 1160. The RF chip 1160 may perform a communication with the application processor 1110. A physical layer (PHY) 1113 of the portable electronic device 1000 and a physical layer (PHY) 1161 of the RF chip 1160 may perform data communications based on a MIPI DigRF. The application processor 1110 may further include a DigRF MASTER 1114 that controls the data communications of the PHY 1161. The portable electronic device 1000 may include a global positioning system (GPS) 1120, a storage 1170, a MIC 1180, a DRAM device 1185, and a speaker 1190. The portable electronic device 1000 may perform communications using an ultra-wideband (UWB) 1210, a wireless local area network (WLAN) 1220, a worldwide interoperability for microwave access (WIMAX) 1130, etc. However, a structure and an interface of the portable electronic device 1000 are not limited thereto.

Inventive concepts may be applied to an image sensor and an electronic device including the image sensor. For example, inventive concepts may be applied to a computer, a laptop, a digital camera, a cellular phone, a smart phone, a smart pad, a tablet PC, a personal digital assistants (PDA), a portable multimedia player (PMP), a navigation system, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of inventive concepts. Accordingly, all such modifications are intended to be included within the scope of the inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. An image sensor comprising:
a pixel array including at least one unit pixel configured to generate accumulated charges corresponding to incident light during a photoelectric conversion period;
a correlated double sampler configured to perform a correlated double sampling operation to extract an effective signal component based on a signal component and a reset component from the unit pixel for at least first and second read-out periods, the correlated double sampler configured to read out an image signal during the first read-out period based on the effective signal component for the first read-out period and to read out a light noise signal during the second read-out period following the first read-out period based on the effective signal component for the second read-out period;
an analog-digital converter configured to convert the image signal into a first digital signal and to convert the light noise signal into a second digital signal; and
an image compensator configured to generate a compensated image signal based on the second digital signal, the first digital signal, and a compensation ratio corresponding to a first time divided by a second time, the compensation ratio being based on a scan sequence of the unit pixel.

2. The image sensor of claim 1, further comprising:
a controller configured to control the pixel array, the correlated double sampler, the analog-digital converter, and the image compensator.

3. The image sensor of claim 1, further comprising:
a digital signal processor configured to output a final image signal by performing a digital signal processing on the compensated image signal.

4. The image sensor of claim 3, wherein the correlated double sampler is in the analog-digital converter, and the image compensator is in the digital signal processor.

5. The image sensor of claim 1, wherein the unit pixel includes:
a photoelectric conversion device configured to convert the incident light into charges and to generate the accumulated charges by accumulating the charges;
a charge storage device configured to store the accumulated charges;

a first transfer transistor configured to operate based on a first transfer signal, the first transfer transistor being connected between the photoelectric conversion device and the charge storage device;

a second transfer transistor configured to operate based on a second transfer signal, the second transfer transistor being connected between the charge storage device and a floating diffusion node;

a reset transistor configured to operate based on a reset signal, the reset transistor being connected between the floating diffusion node and a high power voltage;

a sensing transistor configured to operate based on the accumulated charges, the sensing transistor being connected to the high power voltage; and a select transistor configured to operate based on a row select signal, the select transistor being connected between the sensing transistor and an output terminal.

6. The image sensor of claim 5, wherein the unit pixel further includes:

an overflow transistor configured to operate based on an overflow signal, the overflow transistor being connected between the high power voltage and the photoelectric conversion device.

7. The image sensor of claim 1, wherein the image compensator is configured to generate the compensated image signal by subtracting a multiplied value from the first digital signal, the multiplied value being based on a product of the second digital signal and the compensation ratio.

8. The image sensor of claim 7, wherein the compensation ratio increases as the unit pixel has a later scan sequence in one frame.

9. The image sensor of claim 8, wherein the first time corresponds to a time before the correlated double sampler performs the correlated double sampling operation on a scan-line in the first read-out period, and the second time corresponds to a time between an end point of the correlated double sampling operation on the scan-line in the first read-out period and a start point of the correlated double sampling operation on the scan-line in the second read-out period.

10. The image sensor of claim 1, wherein the second read-out period is shorter than the first read-out period, and a second correlated double sampling period of the second read-out period in which the correlated double sampling operation is performed by the correlated double sampler is shorter than a first correlated double sampling period of the first read-out period in which the correlated double sampling operation is performed by the correlated double sampler.

11. The image sensor of claim 10, wherein a second signal component output period of the second read-out period associated with the signal component for the second read-out period is shorter than a first signal component output period of the first read-out period associated the signal component for the first read-out period.

12. The image sensor of claim 11, wherein the second signal component output period is based on a frames-per-second (FPS) of the image sensor.

13. A portable electronic device comprising:

a global shutter image sensor;

a display device configured to display an image based on a final image signal input from the global shutter image sensor; and a processor configured to control the global shutter image sensor and the display device, wherein the global shutter image sensor includes, a pixel array including at least one unit pixel configured to generate accumulated charges corresponding to incident light during a photoelectric conversion period, a correlated double sampler configured to perform a correlated double sampling operation to extract an effective signal component based on a signal component and a reset component from the unit pixel for at least first and second read-out periods, the correlated double sampler configured to read out an image signal during the first read-out period based on the effective signal component for the first read-out period and to read out a light noise signal during the second read-out period following the first read-out period based on the effective signal component for the second read-out period, an analog-digital converter configured to convert the image signal into a first digital signal and to convert the light noise signal into a second digital signal, an image compensator configured to generate a compensated image signal based on the second digital signal, the first digital signal, and a compensation ratio corresponding to a first time divided by a second time, the compensation ratio being based on a scan sequence of the unit pixel, and a digital signal processor configured to output the final image signal by performing a digital signal processing on the compensated image signal.

14. The portable electronic device of claim 13, wherein the image compensator is configured to generate the compensated image signal by subtracting a multiplied value from the first digital signal, the multiplied value being based on a product of the second digital signal and the compensation ratio.

15. The portable electronic device of claim 14, wherein the compensation ratio increases as the unit pixel has a later scan sequence in one frame.

16. The portable electronic device of claim 15, wherein the first time corresponds to a time before the correlated double sampler performs correlated double sampling operation on a scan-line in the first read-out period, and the second time corresponds to a time between an end point of the correlated double sampling operation on the scan-line in the first read-out period and a start point of the correlated double sampling operation on the scan-line in the second read-out period.

17. The portable electronic device of claim 13, wherein the second read-out period is shorter than the first read-out period, and a second correlated double sampling period of the second read-out period in which the correlated double sampling operation is performed by the correlated double sampler is shorter than a first correlated double sampling period of the first read-out period in which the correlated double sampling operation is performed by the correlated double sampler.

18. A portable electronic device comprising:

a global shutter image sensor configured to selectively operate in one of a single correlated double sampling mode in which a first correlated double sampling operation for reading out an image signal is only performed by the global shutter image sensor and a multiple correlated double sampling mode in which the first correlated double sampling operation and a second correlated double sampling operation for reading out a light noise signal are performed by the global shutter image sensor, the global shutter image sensor configured to generate a final image signal based on the selected operation;
a display device configured to display an image based on the final image signal; and
a processor configured to control the global shutter image sensor and the display device,
wherein the global shutter image sensor selectively operates in the one of the single correlated double sampling mode and the multiple correlated double sampling mode based on a user command or an algorithm.

19. The portable electronic device of claim 18, wherein the global shutter image sensor is configured to operate in the multiple correlated double sampling mode when a light noise elimination mode is selected as an image capturing mode of the portable electronic device by the user command or when light noise occurrence is determined to be larger than a reference value by the algorithm.

* * * * *